(12) United States Patent
Fiske

US009858401B2

(10) Patent No.: US 9,858,401 B2
(45) Date of Patent: Jan. 2, 2018

(54) SECURING TRANSACTIONS AGAINST CYBERATTACKS

(75) Inventor: Michael Stephen Fiske, San Francisco, CA (US)

(73) Assignee: Biogy, Inc., San Francisco, CA (US)

( * ) Notice: Subject to any disclaimer, the term of this patent is extended or adjusted under 35 U.S.C. 154(b) by 111 days.

(21) Appl. No.: 13/541,733

(22) Filed: Jul. 4, 2012

(65) Prior Publication Data

US 2013/0042111 A1 Feb. 14, 2013

(51) Int. Cl.
H04L 9/32 (2006.01)
G06F 21/32 (2013.01)

(52) U.S. Cl.
CPC ............ G06F 21/32 (2013.01); H04L 9/3239 (2013.01); *H04L 2209/56* (2013.01)

(58) Field of Classification Search
CPC .......... G07F 7/1025; G07F 7/12; G06F 21/32; G06F 21/34; H04L 63/0838; H04L 63/0848; H04L 63/0861; H04L 63/12; H04L 63/0807; H04L 9/3236; H04L 9/3247
USPC ...... 713/173, 176, 184, 185, 186; 726/9, 20, 726/30
See application file for complete search history.

(56) References Cited

U.S. PATENT DOCUMENTS 5,809,143 A * 9/1998 Hughes ............................ 705/77
5,926,549 A * 7/1999 Pinkas .................... H04L 29/06
340/5.1
6,836,888 B1 * 12/2004 Basu et al. ..................... 718/104
7,281,133 B2 * 10/2007 Ginter et al. .................. 713/176
7,669,236 B2 2/2010 Fiske
7,702,911 B2 4/2010 Fiske
(Continued)

FOREIGN PATENT DOCUMENTS

KR 10-2010-0136269 A 12/2010
KR 10-2011-0039947 A 4/2011
(Continued)

OTHER PUBLICATIONS

Search Report issued in European patent publication No. EP2758922A2, Publication Date: Jul. 30, 2014, Applicant: Biogy, Inc.

*Primary Examiner* — Michael Pyzocha
*Assistant Examiner* — Paul Callahan
(74) *Attorney, Agent, or Firm* — David Lewis

(57) ABSTRACT

Methods and systems are provided for performing a secure transaction. Users register biometric and/or other identifying information. A registration code and an encryption key are generated from the biometric information and/or information obtained from a unpredictable physical process and are stored in a secure area of a device and also transmitted to a service provider. A transaction passcode generator may be computed based on the stored registration code. In at least one embodiment, a unique transaction passcode depends upon the transaction information, so that on the next step of that transaction, only that unique transaction passcode will be valid. In an embodiment, the passcode includes the transaction information. In at least one embodiment, if the transaction information has been altered relative to the transaction information stored in the device's secure area, then the transaction passcode sent during this step will be invalid and transaction may be aborted.

28 Claims, 14 Drawing Sheets

(56) References Cited

U.S. PATENT DOCUMENTS

| | | | |
|---|---|---|---|
| 7,707,622 B2 | 4/2010 | Fiske | |
| 7,770,018 B2 | 8/2010 | Fiske | |
| 7,886,155 B2 | 2/2011 | Fiske | |
| 7,979,716 B2 | 7/2011 | Fiske | |
| 8,209,751 B2 | 6/2012 | Fiske | |
| 8,230,231 B2* | 7/2012 | Freeman et al. | 713/184 |
| 8,291,226 B2* | 10/2012 | Chun et al. | 713/176 |
| 8,302,167 B2* | 10/2012 | Mennes et al. | 726/5 |
| 8,817,981 B2 | 8/2014 | Fiske | |
| 8,832,211 B1* | 9/2014 | Lebedev et al. | 709/206 |
| 8,973,114 B2* | 3/2015 | von Krogh | G06F 21/31 726/6 |
| 8,996,879 B2* | 3/2015 | Poornachandran | G06F 21/32 713/186 |
| 9,152,779 B2 | 10/2015 | Fiske | |
| 9,235,697 B2 | 1/2016 | Fiske | |
| 2002/0046189 A1* | 4/2002 | Morita et al. | 705/67 |
| 2002/0186688 A1* | 12/2002 | Inoue et al. | 370/352 |
| 2003/0233555 A1* | 12/2003 | Shusteri | 713/185 |
| 2004/0230536 A1* | 11/2004 | Fung et al. | 705/64 |
| 2005/0131834 A1* | 6/2005 | Rodriguez et al. | 705/64 |
| 2006/0107041 A1 | 5/2006 | Fiske | |
| 2006/0107063 A1 | 5/2006 | Fiske | |
| 2006/0107065 A1 | 5/2006 | Fiske | |
| 2006/0107309 A1 | 5/2006 | Fiske | |
| 2006/0107312 A1 | 5/2006 | Fiske | |
| 2006/0107315 A1 | 5/2006 | Fiske | |
| 2007/0102508 A1* | 5/2007 | McIntosh | 235/379 |
| 2007/0113294 A1* | 5/2007 | Field et al. | 726/27 |
| 2008/0288786 A1 | 11/2008 | Fiske | |
| 2009/0063850 A1 | 3/2009 | Joram et al. | |
| 2009/0076950 A1* | 3/2009 | Chang et al. | 705/39 |
| 2009/0158049 A1 | 6/2009 | Fiske | |
| 2009/0172402 A1* | 7/2009 | Tran | 713/170 |
| 2009/0228714 A1 | 9/2009 | Fiske et al. | |
| 2009/0313687 A1* | 12/2009 | Popp et al. | 726/9 |
| 2009/0316903 A1* | 12/2009 | Jeung | 380/271 |
| 2010/0223460 A1 | 9/2010 | Blokzijl et al. | |
| 2010/0274677 A1* | 10/2010 | Florek et al. | 705/16 |
| 2011/0231315 A1* | 9/2011 | Bandyopadhyay et al. | 705/44 |

FOREIGN PATENT DOCUMENTS

| | | |
|---|---|---|
| WO | WO 2006/069082 A2 | 6/2006 |
| WO | WO 2006/091301 A2 | 8/2006 |
| WO | WO 2010/057204 A1 | 5/2010 |
| WO | WO 2013/044192 A2 | 3/2013 |
| WO | WO 2015/023550 A1 | 2/2015 |

* cited by examiner

```
                    Web Browser

User Account Name:   Mary Hales

User Account Info:   Wells Fargo  765-1234-789

Transaction Amount: 5,000

Recipient Name:      Fred Jones

Recipient Account Info: Deutschbank 012-1234-789
```

FIG. 7

SECURING TRANSACTIONS AGAINST CYBERATTACKS

CROSS-REFERENCE TO RELATED APPLICATIONS

This application claims the benefit of U.S. Provisional Patent Application 61/574,752 entitled, SECURING TRANSACTIONS AGAINST CYBERATTACKS, by Michael Stephen Fiske, filed Aug. 9, 2011, the entire contents of which are incorporated herein by reference; this application claims the benefit of U.S. Provisional Patent Application 61/626,485 entitled, SECURING FINANCIAL TRANSACTIONS AGAINST CYBERATTACKS, by Michael Stephen Fiske, filed Sep. 25, 2011, the entire contents of which are incorporated herein by reference. This claims the benefit of U.S. Provisional Patent Application 61/659,376 entitled, SECURING FINANCIAL TRANSACTIONS AGAINST CYBERATTACKS, by Michael Stephen Fiske, filed Jun. 13, 2012, the entire contents of which are incorporated herein by reference.

FIELD OF THE INVENTION

This specification relates to computer security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A shortcoming in the prior art, recognized by this specification, is that there is a lack of a secure integration of the identity of the user to the protection of the user's data and the control of the user's computer. A critical part of the computer instructions for an action or a transaction are usually executed on the host domain machine (e.g., the user's computer). Some examples of the user's computer are a Mac Book Pro, a Dell desktop computer, an IPhone, a Blackberry or an Android phone. Currently cryptography keys are stored on the user's computer or a chip executing the operating system, which is not secure. For example, when Bob's computer communicates with Mary's computer, even when using well-implemented Public Key Infrastructure (PKI), Bob's computer can only be sure that it is communicating with Mary's computer. Bob can not be sure that he is communicating with Mary and vice versa. Similarly, even Bob cannot be certain that the communications he sends Mary are the same as the communications that Mary receives as coming from him.

Sending a secure communication using Public Key Infrastructure (PKI) from one user machine to another user machine ensures secure communication between the user machines, but may not ensure secure communication between the users of the machines. Continuing, with the above example, as a result of the use of a Public Key Infrastructure, although Mary may be reasonably sure that Mary's machine is communicating with Bob's machine, Boris may be operating one or more computers in Russia and may have remotely broken into Bob's computer and may be using Bob's machine and pretending to be Bob.

In the prior art, each computer cannot be assured of who controls the other computer. For example, even when a user is present, an intruder (e.g., a hacker) may be physically located thousands of miles away, but is remotely logged onto the user's machine and hijacking the user's intended action(s). Even the Trusted Platform Module (TPM) has the fundamental cyber security weakness of not knowing who controls the other computer with which a user may be in communication with or who controls the computer which contains the Trusted Platform Module. Not knowing the other computer with which a current computer is in communication with may be a weakness that is significant when the operating system can directly access the TPM. If the user's computer is compromised, then the attacker can access the TPM. Another limitation and weakness of the TPM is that there is no mechanism for binding the identity of the user to the user's cryptography keys and other confidential information that should be bound to the user's true identity.

Another shortcoming of cyber security is that a secure link is missing between the authentication of a valid user, and the authorization of an action. The authorization of an action could be the execution of a financial transaction from a user's bank account, a stock trade in a user's brokerage account, the execution of an important functionality on the electrical grid, or access to important data on a private network such as SIPRnet (e.g. WikiLeaks). The authorization of an action typically occurs through the web browser since the web browser presents a convenient interface for a person. However, the web browser is where the important connection between authentication of a user and authorization of an action may be broken. Existing systems have the user authenticating the user's computer, and then the same user's computer also authorizes (and may also execute) the action. Since the user's computer can be hacked, the lack of a secure and direct link between authenticating the user's computer and authorizing the action may render the act of user verification irrelevant.

Part of the disconnect (vulnerability) between authenticating the user and authorizing the user's action occurs, because authentication (e.g., biometric authentication) is typically and naively represented as an on/off switch. That is, after the user has been authenticated and the initial transaction approved, the remainder of the session is assumed to be secure and all actions after authentication are assumed to be legitimate, without performing any further checks. In the same way, if this on/off implementation occurs in an untrusted computing environment, then outstanding biometric algorithms and sensor(s) become irrelevant because the biometric authentication can be circumvented between the user authentication and the authorization or confidentiality part of the security system.

The use of biometrics can be advantageous for security, because biometrics offers a reliable method for verifying who (the person) is that is actually initiating a transaction. However, even with the use of biometrics, if the handling of the biometric information, the storage of the biometric data, or the control of actions based on a biometric verification is done on an unsecured user's computer, the value of the biometrics may be greatly reduced or nullified.

An additional aspect of the weakness of current authentication and authorization processes (such as those using biometrics) is that the action can be hijacked by executing a Trojan attack on the user's computer, for example. A Trojan attack is an attack in which the attacker pretends to be the user and/or the other system to which the user is communicating with. In other words, a valid, authorized user cannot verify that the action he or she is trying to execute is what is actually being executed, because a third party may be masquerading as the other system.

An example of this weakness is the untrusted browser attack used to divert money from a user's bank account. Mary's web browser may display to her that she is about to send $500 to Bob's account, but in reality her untrusted browser is configured to send $50,000 to a thief's bank account.

Since the web browser is executed on the user's computer, the browser cannot be trusted even when using PKI and one-time passcodes! A recent untrusted browser attack on the gold standard of security, RSA SecurID, demonstrates this surprising fact. The consequences of this particular cyberattack were that $447,000 was stolen from a company bank account in a matter of minutes, even though the valid user was using one-time passcodes to make the transaction more secure. The details of this cyberattack are quoted below in a MIT Technology Review, entitled "Real-Time Hackers Foil Two-Factor Security," Sep. 18, 2009, which states, "In mid-July, an account manager at Ferma, a construction firm in Mountain View, Calif., logged into the company's bank account to pay bills, using a one-time password to make the transactions more secure. Yet the manager's computer had a hitchhiker A forensic analysis performed later would reveal that an earlier visit to another website had allowed a malicious program to invade his computer. While the manager issued legitimate payments, the program initiated 27 transactions to various bank accounts, siphoning off $447,000 in a matter of minutes. "They not only got into my system here, they were able to ascertain how much they could draw, so they drew the limit," says Roy Ferrari, Ferma's president. The theft happened despite Ferma's use of a one-time password, a six-digit code issued by a small electronic device every 30 or 60 seconds. Online thieves have adapted to this additional security by creating special programs—real-time Trojan horses—that can issue transactions to a bank while the account holder is online, turning the one-time password into a weak link in the financial security chain. "I think it's a broken model," Ferrari says. Security experts say that banks and consumers alike need to adapt—that banks should offer their account holders more security and consumers should take more steps to stay secure, especially protecting the computers they use for financial transactions. 'We have to fundamentally rethink how customers interact with their banks online,' says Joe Stewart, director of malware research for security firm SecureWorks, in Atlanta, Ga. 'Putting all the issues with the technology aside, if [attackers] can run their code on your system, they can do anything you can do on your computer. They can become you."

A third fundamental shortcoming of current cybersecurity solutions is the fact that static authentication factors, such as passwords, PINs and biometrics, are entered directly into the user's computer or stored on computers that can be accessed in the network domain. The host domain and network are untrusted environments. This weakness makes static authentication factors vulnerable to phishing attacks in the host domain or security breaches in the network domain. Furthermore, some biometric factors are immutable, and if an immutable biometric factor is compromised, then the reuse of the compromised biometric factor reduces the security of the system.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 7 shows a diagram of an embodiment of a browser with the recipient information being entered into the web browser;

DETAILED DESCRIPTION

Although the issues discussed in the background or elsewhere may have motivated some of the subject matter disclosed below, nonetheless, the embodiments disclosed below do not necessarily solve all of the problems associated with the subject matter discussed in the background or elsewhere. Some embodiments only address one of the problems, and some embodiments do not solve any of the problems associated with the subject matter discussed in the background or elsewhere. In general, the word "embodiment" is used to specify an optional feature and/or configuration.

Security solutions are provided for secure transactions against untrusted browser attacks and other cyberattacks. In some embodiments, the solution(s) described in the specification secure payment transactions. In other embodiments, the solution(s) may secure access and use of private networks such as Secret Internet Protocol Router Network (SIPRnet) or resources on a public infrastructure such as the electrical grid.

The System

Figure 1A:
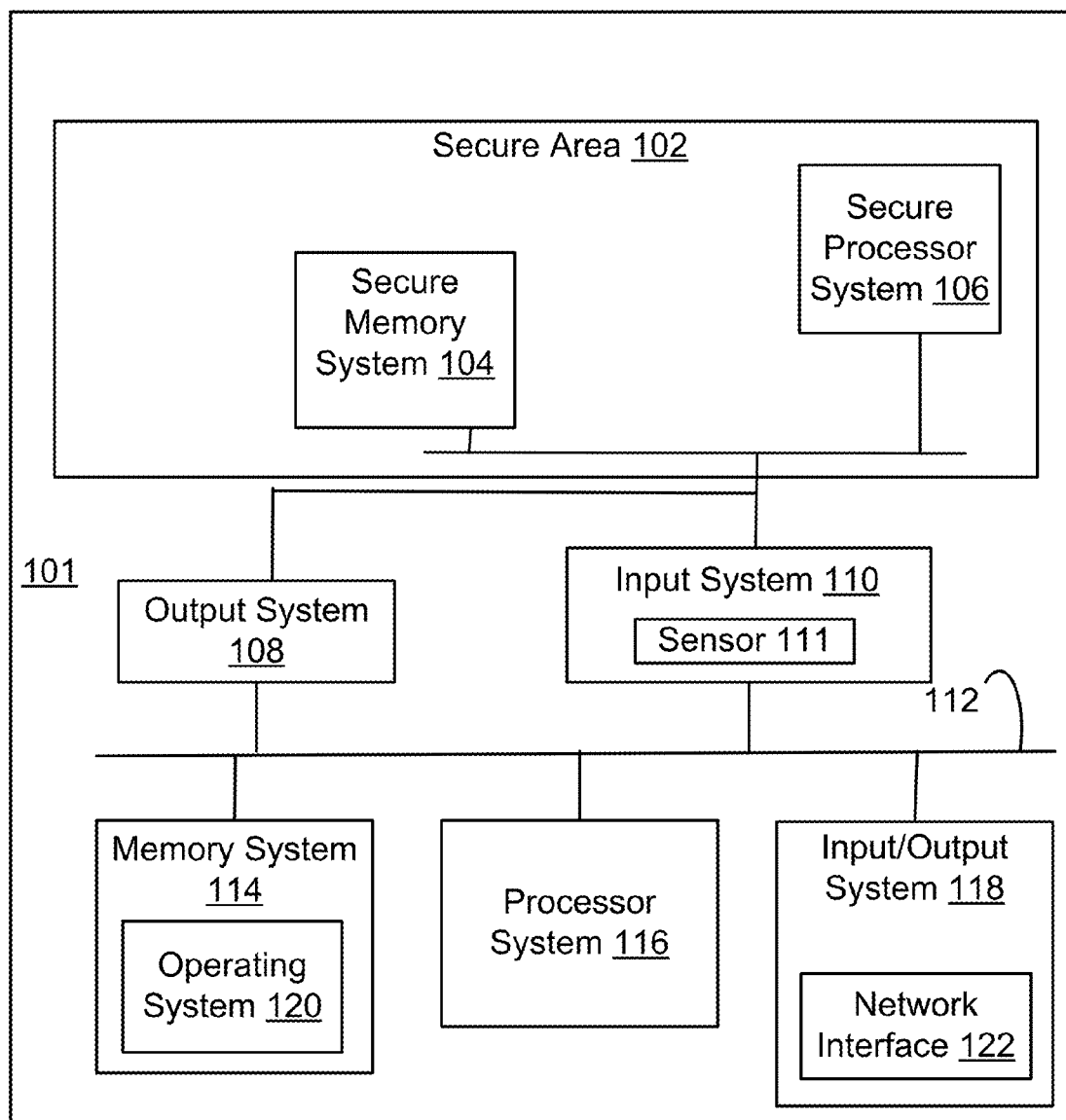
FIG. 1A shows a block diagram of an embodiment of a system for secure transactions against cyberattacks.

FIG. 1A shows an embodiment of a system 100 for providing secure transactions. In an embodiment, system 100 may include user system 101, and user system 101 may include secure area 102, secure memory system 104, user information 104B, secure processor system 106, output system 108, input system 110, sensor 111, communication system 112, memory system 114, processor system 116, input/output system 118, operating system 120, and network interface 122. System 100 may also include network 124 and service provider system 126. In other embodiments, system 100 may not have all of the elements or features listed and/or may have other elements or features instead of, or in addition to, those listed.

System 100 is a system within which a secure transaction takes place (FIGS. 1A-3B discuss various details of system 100 and FIGS. 3C-6 discuss various methods for using system 100). In this specification the word system refers to any device or system of devices that communicate with one another. User system 101 is one that has a secure area that is dedicated for performing secure transactions over a network. User system 101 may be a single device or a combination of multiple devices. User system 101 may be a portable device, personal computer, laptop, tablet computer, handheld computer, mobile phone, or other network system, for example (in this specification a network system is any device or system that is capable of sending and/or receiving communications via a network). In an embodiment, a secure area 102 may be provided for performing secure transactions. In this specification, authentication information references to any form of information used for authenticating a user. In an embodiment, within secure area 102, authentication information, such as a biometric authentication and/or another form of authentication is bound to the authorization of an action. In other words, the authentication information is in some way combined with the information for performing the action, such as by being concatenated together and then applying a hash function to the result of the concatenation. In this specification, the words "action" and "transaction" may be switched one with another to obtain different embodiments. Throughout this specification, when ever information is disclosed as being combined, the information may be concatenated, added together (e.g., in a binary addition of the binary values of information), be different inputs to the same function, and/or combined in another manner.

A hash function, denoted by $\Phi$, is a function that accepts as its input argument an arbitrarily long string of bits (or bytes) and produces a fixed-size output. In other words, a hash function maps a variable length message m to a fixed-sized output, $\Phi(m)$. Typical output sizes range from 160 bits, 256 bits, 512 bits, or can also be substantially larger.

An ideal hash function is a function $\Phi$ whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, the hash functions that are used are one-way. A one-way function $\Phi$ has the property that given an output value z, it is computationally extremely difficult to find a message $m_z$ such that $\Phi(m_z)=z$. In other words, a one-way function $\Phi$ is a function that can be easily computed, but that its inverse $\Phi^{-1}$ is extremely difficult to compute. Other types of one way functions may be used in place of a hash function.

Any of a number of hash functions may be used. One possible hash function is SHA-1, designed by the National Security Agency and standardized by the NIST, [NIST_STANDARDS_1995]. The output size of SHA-1 is 160 bits. Other alternative hash functions are of the type that conform with the standard SHA-256, which produces output values of 256 bits, and SHA-512, which produces output values of 512 bits, [NIST_STANDARDS_2001]. A hash function could be one of the SHA-3 candidates. A candidate example of a hash function is BLAKE. Another example of a hash function is GrØstl. Another example of a hash function is JH. Another example of a hash function is Keccak. Another example of a hash function is Skein.

In an embodiment, secure area 102 may have its own secure processor system and secure memory system, which are not accessible by the rest of user system 101. Secure area 102 may be capable of taking over and/or blocking access to other parts of user system 101.

Secure memory system 104 may be a dedicated memory for securing transactions. In an embodiment, secure memory system 104 may not be accessed by the other processor systems of user system 101. Memory system 104 may include, for example, any one of, some of, any combination of, or all of a long-term storage system, such as a hard drive; a short-term storage system, such as random access memory; a removable storage system, such as a floppy drive or a removable drive; and/or flash memory. Memory system 104 may include one or more machine-readable mediums that may store a variety of different types of information. Secure memory system 104 may store methods and information needed to perform the secure transaction, such as a method for generating a passcode generator, user information, a method of generating a registration code generator, and encryption/decryption code. Secure memory system 104 may include one or more memory units that each write and/or read to one or more machine readable media. The term machine-readable medium is used to refer to any non-transient medium capable carrying information that is readable by a machine. One example of a machine-readable medium is a computer-readable medium. Another example of a machine-readable medium is paper having holes that are detected that trigger different mechanical, electrical, and/or logic responses. The content of secure memory 104 is discussed further in FIG. 1B, below.

Secure processor system 106 may include one or more processors. Processor system 116 may include any one of, some of, any combination of, or all of multiple parallel processors, a single processor, a system of processors having one or more central processors and/or one or more specialized processors dedicated to specific tasks. Processor system 116 implements the machine instructions stored in memory 114. Secure processor system 106 may include one or more processors that cannot be accessed by the main processor of the user system 101. For example, in an embodiment all of the processors of secure processor system 106 cannot be accessed by the main processor of system 101. In an embodiment, the operating system of user system 101 may have no access to secure area 102, and in an embodiment, secure area 102 may be programmed without benefit of an operating system, so that there is no standard manner of programming secure area 102, which thwarts hackers from sending read and/or write commands (or any other commands) to secure area 102, because secure area does not use standard read and write commands (and does not use any other standard commands). As a consequence, providing secure area 102 addresses the weakness of biometric authentication and other authentication methods. Secure memory system 104 may store a transaction passcode generator (which will be described later in conjunction with FIG. 3A).

Output system 108 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. In an embodiment, secure processor system 106 may be capable of taking over and using any portion of and/or all of output system 108. In an embodiment, a portion of the output system may be a dedicated display system that may be accessed only by secure area 102. In an embodiment, secure processor 106 may be capable of receiving input from input system 110 and/or blocking access to output system 108 by the main processor system and/or other devices.

Input system 110 may include any one of, some of, any combination of, or all of a biometric sensor 111, a keyboard system, a touch sensitive screen, a tablet pen, a stylus, a mouse system, a track ball system, a track pad system, buttons on a handheld system, character entry such as letters and numbers a scanner system, a microphone system, a connection to a sound system, and/or a connection and/or interface system to a computer system, intranet, and/or internet (e.g. IrDA, USB). In an embodiment, character entry may be performed on a touch sensitive screen such as an IPhone, IPad or Android phone. In an embodiment, biometric sensor 111 may be a finger print scanner or a retinal scanner. In an embodiment, user system 101 stores the processed data from user information 104B during registration. In an embodiment user system 101 retrieves user information 104B and compares the scanned output of sensor 111 to user information 104B to authenticate a user. In an embodiment secure processor 106 may be capable of receiving input from input system 110 and/or blocking access to input system 110 by the main processor system and/or other devices.

Communication system 112 communicatively links output system 108, input system 110, memory system 114, processor system 116, and/or input/output system 118 to each other. Communications system 112 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Memory system 114 may include, for example, any one of, some of, any combination of, or all of a long-term storage system, such as a hard drive; a short-term storage system, such as random access memory; a removable storage system, such as a floppy drive or a removable drive; and/or flash memory. Memory system 114 may include one or more machine-readable mediums that may store a variety of different types of information. Memory system 114 and memory system 104 may use the same type memory units and/or machine readable media. Memory system 114 may also store the operating system of user system 101 and/or a web browser (which may also be referred to as an HTTP client). In embodiment, memory system 114 may also store instructions for input system 110 to read in biometric data and send the biometric data to secure area 102.

Processor system 116 may include one or more processors. Processor system 116 may include any one of, some of, any combination of, or all of multiple parallel processors, a single processor, a system of processors having one or more central processors and/or one or more specialized processors dedicated to specific tasks. Processor system 116 implements the machine instructions stored in memory 114. In an embodiment, processor 116 does not have access to secure area 102.

In an alternative embodiment, processor 116 only communicates to secure area 102 when secure area 102 authorizes processor 116 to communicate with secure area 102. Secure area 102 may prevent processor 116 from communicating to secure 102 during the secure area's execution of critical operations such as setup, generation of keys, registration code, biometric authentication or decryption of transaction information.

Input/output system 118 may include devices that have the dual function as input and output devices. For example, input/output system 118 may include one or more touch sensitive screens, which display an image and therefore are an output device and accept input when the screens are pressed by a finger or stylus, for example. The touch sensitive screen may be sensitive to heat and/or pressure. One or more of the input/output devices may be sensitive to a voltage or current produced by a stylus, for example. Input/output system 118 is optional, and may be used in addition to or in place of output system 108 and/or input device 110. In an embodiment, a portion of the input/output system 118 may be dedicated to secure transactions providing access only to secure area 102. In an embodiment, secure processor 106 may be capable of receiving/sending input/output from/via input system 110 and/or blocking access to input system 110 by the main processor system and/or other devices. Restricting access to a portion of and/or all of the input/output system 118 denies access to third party systems trying to hijack the secure transaction.

Operating system 120 may be a set of machine instructions, stored in memory system 110, to manage output system 108, input system 110, memory system 114, input/output system 118 and processor system 116. Operating system 120 may not have access to secure area 102. Network interface 122 may be an interface that connects user system 101 with the network. Network interface 122 may be part of input/output system 118.

Network 124 may be any network and/or combination of networks of devices that communicate with one another (e.g., and combination of the Internet, telephone networks, and/or mobile phone networks). Service provider system 126 (which will be discussed further in conjunction with FIG. 2A) may receive the transactions. The recipient may be the final recipient or an intermediary recipient of transactions.

Service provider system 126 may be a financial institution or a recipient of a secure transaction. User system 101 may interact with any of a variety of service provider systems, such as service provider system 126, via a network 124, using a network interface 122. Service provider system 126 may be a system of one or more computers or another electronic device, and may be operated by a person that grants a particular user access to its resources or enables a particular event (e.g., a financial transaction, a stock trade, or landing a plane at an airport, and so on).

Methods for securing transactions are disclosed in this specification, which may be implemented using system 100. A financial transaction may be an instance or embodiment of a transaction. Further, a stock trade is one embodiment of a financial transaction; a bank wire transfer is an embodiment of a financial transaction and an online credit card payment is an embodiment of a financial transaction. Any operation(s) that runs in a trusted environment, which may be secure area 102 may be treated as a secure transaction. In an embodiment, every secure transaction may include one or more atomic operations and the use of the word transaction is generic to both financial transactions and operations including atomic operations unless stated otherwise. In this specification, the word transactions is also generic to an individual or indivisible set of operations that must succeed or fail atomically (i.e., as a complete unit that cannot remain in an intermediate state). Operations that require security may include operations that make use of, or rely on, the confidentiality, integrity, authenticity, authority, and/or accountability of a system should be executed in a trusted environment (e.g., in a secure area, such as secure area 102). Types of operations that require security may be treated as secure transactions. Further, a successful transaction other than logging information alters a system (e.g., of service provider 126) from one known, good state to another, while a failed transaction does not. To be sure that a transaction results in a change of state only when the transaction is successful—particularly in systems that handle simultaneous actions—rollbacks, rollforwards, and deadlock handling mechanisms may be employed to assure atomicity and system state integrity, so that if there is an error in the transaction, the transaction does not take effect or does not cause an unacceptable state to occur.

In at least one embodiment, a secure transaction assures the following properties:

A. Availability: Having timely and reliable access to a transactional resource.

B. Confidentiality: Ensuring that transactional information is accessible only to those authorized to use the transactional information.

C. Integrity: Ensuring that transactional information is protected from unauthorized modification.

D. Authentication: Ensuring that transactional resources and users accessing the transactional resources are correctly labeled (identified).

E. Authorization: Ensuring that only authorized users have access rights to transactional resources.

F. Accounting: Ensuring that a transaction cannot be repudiated. Any operation that handles or provides access to data deemed too sensitive for an untrusted environment (e.g., any private data) may be treated as a secure transaction to ensure that information leakage does not occur.

In at least one embodiment, a unique passcode is bound to, and depends upon, the transaction information. In an embodiment, each step of the transaction uses a different transaction passcode that is dependent on the transaction information and user verification information. In other words, in an embodiment, the passcode includes the transaction information. Furthermore, in at least one embodiment, if the transaction information has been altered relative to the transaction information stored in the user's secure area 102, then the unique passcode sent following the alteration will be invalid (an example, of a manner in which the transaction being altered is the dollar amount and account number of the recipient could be altered in an untrusted browser). Since the alteration of the transaction alters the passcode, the execution of the transaction would fail due to the incorrect unique passcode during that transaction step.

In addition, the secure transaction solution can be executed on a standalone portable device—e.g., a secure flash drive, portable token, or in a secure chip or a secure part of a chip, and the use of a standalone portable device makes it difficult for an attacker to gain access. In at least one embodiment, the secure chip or secure part of the chip may reside in a mobile phone. Some examples of a mobile phone are an Android phone, the iPhone and the Blackberry. In at least one embodiment, the secure chip or secure part of the chip may reside in a personal computer. In at least one embodiment involving a mobile phone or computer, the secure chip may be temporarily or permanently disconnected from the rest of the system so that the operating system 120 does not have access to critical information entered into and received (e.g., read or heard) from the secure area's user interface. In at least one embodiment, this critical information may be authentication information, biometric information, passwords, passcodes, passcode generators, PINS, other kinds of authentication factors, transaction information, and/or other user credentials.

In at least one embodiment in which user system 101 is a portable device, the portable device may have a user interface with one or more buttons or a navigation button, which may offer the user five choices (e.g., up, down, left, right, select). In at least one embodiment, the buttons or navigation button may be used to enter a PIN into the secure area. In at least one embodiment, the buttons or navigation buttons may be used to select one or more images stored in the secure area. In an embodiment, character entry of letters, numbers and other symbols may be performed on a touch sensitive screen: some devices that have touch sensitive screens are IPhones, IPads and Android smartphones. In at least one embodiment, the user interface may enable the user to enter transaction information directly to the secure area or secure part of the chip.

Portable embodiments of user system 101 enable users to execute secure transactions in remote places such as inside a jet, on a golf course, inside a moving automobile, from a hotel room, in a satellite, at a military gate, and/or other isolated places.

Although some embodiments of user system 101 below may be described using fingerprints as an example, other items or a combination of these items may be used for verifying the true identity of the person such as face prints, iris scans, finger veins, DNA, toe prints, palm prints, handprints, voice prints and/or footprints. Any place, the expression "biometric prints" occurs any of the above listed different specific types of biometrics may be substituted to get specific embodiments. In terms of what a person knows, the authentication items may be PINs, passwords, sequences, collections of images that are easy to remember, and/or even psychometrics. In an embodiment, the item used to verify the person may be any item that is unique. In an embodiment, the item(s) used to verify the person may be one or more items that as a combination are difficult to fabricate, guess, find by trial and error, and/or compute. In an embodiment, the item(s) used to verify the person are uniquely associated with this person. In an embodiment, the item used to verify the person has an unpredictable element. For example, in one instance, a transaction may require a fingerprint and the person selecting an apple image as user verification where the secure area indicates, via the user interface, to the user to choose their favorite food. In another instance at a later time, a transaction may require a fingerprint and the person selecting a correct image or collection of images from a display screen. Example images could be a picture or photo of an orange, a train, a specific pattern such as a peace sign or a diagram or a logo, a Mercedes, a house, a candle, or a pen. In at least one embodiment, the person may add his or her own images during registration, which are then used for user verification during the transaction. When images are a part of the user verification process, a display screen that is a part of the secure area 102 and/or controlled by secure area 102 is used.

In at least one embodiment, secure area 102 may be a specialized part of the chip (e.g., a microprocessor), where the operating system 120 and web browser software do not have access to this specialized part of the chip. In at least one embodiment, a specialized part of the chip may be able to turn off the operating system 120's access to presses of the buttons or finger presses of the screen of a mobile phone (or other computing device), preventing malware and key or screen logging software from intercepting a PIN, character entry of letters, numbers or other symbols or the selection of one or more images. In at least one embodiment, a specialized part of the chip may be able to temporarily disconnect the rest of the chip's access to the screen (e.g., by preventing the execution of the operating system 120 and web browser). In at least one embodiment, part of the display screen may be permanently disconnected from the part of the chip (e.g., from the microprocessor of the chip) that executes the operating system 120 and web browser. In at least one embodiment, a part of the chip may only have access to the biometric sensor, while the rest of the chip—executing the operating system 120 and web browser—is permanently disconnected from the biometric sensor.

At least one embodiment uses a secure device that produces unique passcodes from biometric prints that can be used as one-time passwords. For each acquired biometric print, the derived passcodes created from the biometric print and the transaction information for that particular transaction is unique.

Another embodiment includes a secure area, such as secure area 102, that executes the biometric acquisition and storage of a registration code, passcode generator, seed, cryptography key(s) and other user credentials, which may be created from the biometric prints or created from unpredictable physical processes in secure area 102, or created from a combination of the biometric prints and unpredictable processes In at least one embodiment, photons may be produced by the hardware as a part of the unpredictable process. In least one embodiment, the unpredictable process may be produced by a specialized circuit in the secure area.

In yet another embodiment of the invention, biometric prints and/or unpredictable information from unpredictable physical processes are used to generate a registration code in the secure area 102. The secure area 102 may include embedded software. In at least one embodiment, the embedded software is on a chip with a physical barrier around the chip to hinder reverse engineering of the chip, and/or hinder access to passcode generators, keys, transaction information, and/or possibly other user credentials. The use of biometric prints to create one-time passcodes within a secure area may eliminate the use of static passwords that need to be memorized and need to be stored on the host computer or need to be stored on an insecure part of the chip executing the operating system 120 and web browser. The use of other biometric information entered into the secure area may eliminate a person entering a static password into an insecure part of the system.

By executing the fingerprint software or other type of biometric software on a secure embedded device, the fingerprints (or other biometric prints) are less susceptible to theft, the biometric prints are not transmitted to the insecure part of the system, nor is there any need to have encrypted templates of the biometric prints transmitted to an insecure device. Each of the above embodiments may be used separately from one another in combination with any of the other embodiments. All of the embodiments of this specification may be used together or separately.

Secure Area in a Device or a Chip

The secure area 102 may be part of user system 101 or a special part of the chip that is able to acquire biometric prints, store authentication information, and/or authenticate the newly acquired items. The authentication information may include templates of biometric prints, images, pins, and/or passwords. The secure area may also be a part of the device where critical transaction information may be entered or verified on a display that the secure area only has access to. In at least one embodiment, the host computer (domain) and the network have no access to the transaction information, no access to the keys, no access to biometrics, no access to passcode generators, and/or no access to other critical user credentials (the transaction information, the keys, the biometrics, passcode generators, and/or other critical user credentials may be the contained and processed by the secure area).

For a payment transaction, one item of transaction information may be the name of the person or entity sending the money. Another item of transaction information may be the name of the person or entity receiving the money. Another item of transaction information, may be the date or time of day. Another item of transaction information may be the sending person's (or entity's) account number. Another item of transaction information may be the receiving person's (or entity's) bank account number (the sending person or entity is the person or entity that sends a message that is part of the transaction and the receiving person or entity is the person or entity that receives the message that is part of the transaction. Another item of transaction information may be the sending person's (or entity's) routing number. Another item of transaction information may be the receiving person's (or entity's) routing number. Another item of transaction information may be the amount of money that may be expressed in dollars, Euros, yen, francs, deutschmark, yuan or another currency.

During setup, one or more biometric prints may be acquired, and one or more unique registration codes and in at least one embodiment encryption keys may be generated from the one or more of the biometric prints (items) or generated from an unpredictable physical process or both. In at least one embodiment, the unpredictable physical process may come from a hardware chip or hardware circuit that uses photons as a part of the unpredictable process to create the encryption keys. During authentication, if the acquired biometric print is an acceptable match, then a sequence of transaction steps that make up the complete transaction may be initiated.

The software that secure area 102 executes may be embedded in secure memory 104. In an embodiment, there is no operating system on the device or on secure area 102 of user system 101. In an alternative embodiment, there is an operating system. The secure biometric print device has a number of components, which are described later. The security of the secure area 102 may be enhanced by any one of, any combination or of, or all of (1) the use of embedded software, (2) the lack of an operating system, and (3) the secure area being at least part of a self-contained device not connected to a computer or the internet. For example, the unit that includes the secure area may contain its own processor. In an embodiment, the secure area may not have any of these security enhancing features. The biometric sensor enables user system 101 to read biometric prints. The biometric sensor may include a fingerprint area sensor or a fingerprint sweep sensor, for example. In at least one embodiment, the biometric sensor may contain an optical sensor that may acquire one or more types of biometrics. In at least one embodiment, the biometric sensor may be a microphone or other kind of sensor that receives acoustic information, such as a person's voice. In at least one embodiment, the sensor may be a device that acquires DNA or RNA. In an embodiment, secure processor system 106 may execute the software instructions, such as acquiring a biometric print from the sensor, matching an acquired biometric print against a stored biometric print, sending communication and control commands to a display, and/or encrypting the registration code and transmitting the registration code to the administrator when the user and administrator are not in the same physical location. By including processor system 106 in secure area 102, the security is enhanced, because the external processor is given fewer chances to inspect contents of secure area 102. Alternatively, secure area 102 may store software instructions that are run by secure processor system 106. Processor system 106 performs the biometric print acquisition, the encryption, and/or generation of the passcode. Alternatively, a specialized logic circuit is built that carries out the functions that the software causes the processors to perform, such as driving sensor 111 (which may be an acquisition unit, such as a biometric sensor).

Secure memory system 104 may contain non-volatile memory in addition to volatile memory. Non-volatile memory enables the device to permanently store information for generating passcodes, encryption keys, and passcode generators. In another embodiment, secure memory system 104 may include memory on secure processor system 106. In another embodiment, the sensor or input system 110 and secure processor system 106 may be integrated into a single chip. Alternatively, in another embodiment, the sensor in input system 110 and secure processor system 106 may be two separate chips.

Content of Memory in Secure Area

Figure 1B:
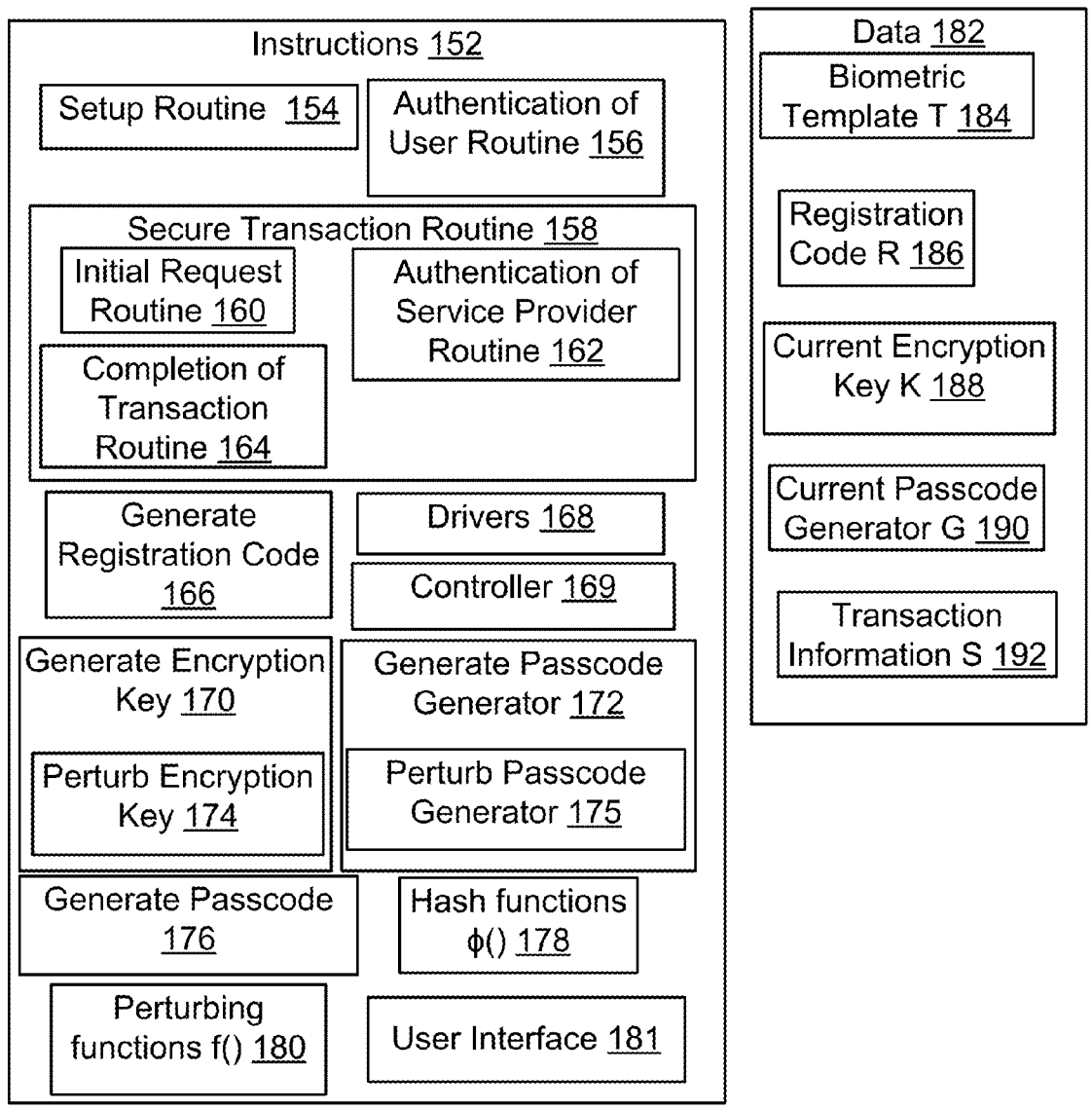
FIG. 1B shows a memory system that is a component of the system shown in 1A.

FIG. 1B shows an embodiment of a block diagram of the contents of memory system 104 of FIG. 1A, Memory system 104 may include instructions 152, which in turn may include a setup routine 154, an authentication of user routine 156, a secure transaction routine 158, having an initial request routine 160, a service provider authentication routine 162, and a completion of transaction routine 164. Instructions 154 (of memory 104) may also include registration code generator 166, drivers 168, controller 169, generate encryption key 170, generate passcode generator 172, perturb encryption key 174, perturb passcode generator 175, generate passcode 176, hash functions 178, perturbing functions 180, and user interface 181. Memory system 104 may also store data 182, which may include biometric template T 184, registration key R 186, current encryption key K 188, current passcode generator G 190, and transaction information S 192. In other embodiments, memory system 104 may not have all of the elements or features listed and/or may have other elements or features instead of, or in addition to, those listed.

Instructions 152 may include machine instructions implemented by processor 106. Setup routine 154 is a routine that handles the setting up of the user system 101, so that user system 101 may be used for performing secure transactions. Setup routine 104 may collect a new user's biometric print, and apply a hash function to the biometric print (and/or to other user information) to generate a registration key R. In at least one embodiment, there may be specialized hardware in the secure area to help create unpredictableness used for the generation of key(s), seed(s), and/or registration code(s). Alternatively, the registration code, seed, or key may be generated by applying the hash function to the raw biometric print data, for example. Similarly, setup routine 154 may apply a hash function to authentication information, such as a biometric print, to hardware noise produced by a phototransistor, and/or other user information or a combination of these to generate an initial encryption key. The setup routine 154 may also send the registration code and/or the encryption key to the service provider system 126. In another embodiment, the registration code R and/or the initial encryption key may be received from service provider 126.

Authentication of user routine 156 may authenticate the user each time the user attempts to use user system 101. For example, user system 101 may include a biometric sensor (e.g., as sensor 111) that scans the user's biometric print, reduces the biometric print to a template, and matches the newly derived biometric template to a stored template (which was obtain by setup routine 154). Then, if the stored template and the newly derived template match, the user is allowed to use user system 101.

In an alternative embodiment, a biometric print acquired may be directly matched with a stored template. Alternatively or additionally, authentication of user routine 156 may require the user to enter a password. If the password received and the password stored match, the user is allowed to use user system 101.

Secure transaction routine 158 is a routine that implements the secure transaction. The initial request routine 160 is a first phase of secure transaction routine 158. One purpose of initial request routine 160 is to generate a passcode from a combination of the current passcode generator and transaction information. The transaction information is encrypted with the encryption key. The encrypted transaction information and the passcode are sent to the service provider. During initial request routine 160, the passcode generator is perturbed and the encryption key is perturbed to obtain a new passcode generator and a new encryption key, respectively. In an alternative embodiment, the encryption key is not changed each time. In an embodiment, each passcode is generated from a different passcode generator. In an embodiment, the passcode is generated from the passcode generator after generating the prior passcode, which may be generated any time after generating the prior passcode and before generating the current passcode, such as just after generating the prior passcode or just before generating the current passcode. After initial request routine 160 sends the passcode and encrypted transaction information to service provider system 126, secure transaction routine 158 waits for a reply, which will include a passcode that is dependent on the passcode generator and transaction information.

Service provider authentication routine 162 authenticates the information provided by the service provider. The transaction passcode sent by the service provider 126 to system 101 in reply to initial request 160 may be authenticated by service provider authentication routine 162 (throughout this specification, the word passcode and the phrase transaction may be substituted one for another to obtain different embodiments). If the service provider that sent the passcode is the wrong service provider, it is unlikely that the service provider will have the correct transaction information and the correct passcode generator, and consequently the passcode returned will be incorrect.

Completion of transaction routine 164 completes the portion of the transaction performed by system 101. If the service provider is authenticated, completion of transaction routine 164 generates yet another passcode from the passcode generator and transaction information and sends the passcode to the service provider.

Registration code generator 166 may be an algorithm for generating a registration code from biometric data, unpredictableness generated by an unpredictable process in the hardware in the secure area of the chip, and/or other information. Instructions 154 (of memory system 104) may also include registration code generator 166. Drivers 168 may include drivers for controlling input and output devices, such as the keyboard, a monitor, a pointing device (e.g., a mouse and/or a touch pad), a biometric print sensor (for collecting biometric prints). Controller 169 may include one or more machine instructions for taking control of the keypad, monitor and/or network interface, so the transaction may be performed securely, without fear of the processor system 116 compromising security as a result of being taken over by malware sent from another machine.

Generate encryption key 170 are machine instructions that generate a new encryption key (e.g., by applying a function). In at least one embodiment, the encryption key is not updated after the initial step. Generate passcode generator 172 may include machine instructions that generate a new passcode generator from a prior passcode generator. In other words, generate passcode generator 172 may be an algorithm for generating a passcode generator from previous passcode generator. Generate passcode generator 172 may combine (e.g., concatenate) the prior passcode generator with current transaction information and apply a one-way function (e.g., a one-way hash) to the combination or may perturb the prior passcode generator. Perturb encryption key 174 perturbs the current encryption key to thereby generate the next encryption key. Perturb passcode generator 175 perturbs the current passcode generator to thereby generate the next passcode generator. The perturbing function could apply a one-way function to the passcode generator and other information. Generate passcode 176 generates a new passcode. Generate passcode 176 may generate the passcode by applying a hash function to a combination of (e.g., a concatenation of) the passcode generator and transaction information.

Hash functions 178 may use one or more one-way functions, which may be used by generate registration code 166 for generating a registration from a biometric print and/or other user information. Alternatively or additionally, hash functions 178 may use a one-way function, which may be used by generate passcode 176 for generating a new passcode from the combination of a passcode generator and transaction information. Optionally, hash functions 178 may include a different function for generate registration code 166 and generate passcode 176. Those hash function(s) of hash functions 178 that are used by initial request 160, authentication of service provider routine 162, and completion of transaction routine 164 may be the same as one another or different from one another.

Perturbing functions 180 may include one or more perturbing functions, which may be used by perturb encryption key 174 and perturb passcode generator 175 generate passcode generator 176. The perturbing functions in perturbing functions 180 used by perturb encryption key 174 and perturb passcode generator 176 may be the same or different from one another. Different perturbing functions of perturbing functions 180 may be used during each initial request 160, authentication of service provider routine 162, and/or completion of transaction routine 164. Although perturbing functions 180 and hash functions 178 are indicated as separate storage areas in perturb encryption key 174 and perturb passcode generator 175, the perturbing functions may just be stored as part of the code for perturb encryption key 174 and perturb passcode generator 175. In this specification anytime a hash function is mentioned or a perturbing function is mentioned any other function may be substituted (e.g., any perturbing function may be replaced with a hash function and any hash function may be replaced with a perturbing function) to obtain another embodiment. Optionally, any perturbing function and/or hash function mentioned in this specification may be a one way function.

User interface 181 provides a page, or another method of displaying and entering information so that the user interface may provide the following functionalities, labeled with the letters A-F.

A. The user may view the transaction information being sent. B. The user may enter instructions for sending transaction information. C. The user may receive information about whether or not the biometric print was acceptable. D. The user may determine whether it is necessary to enter another biometric print or another type of user authentication such as a PIN or a sequence of images known by the user. E. The user may determine the current state in the transaction process. F. The user may read or enter directions for the next step in the transaction process.

Data 182 may include any data that is needed for implementing any of the routines stored in memory 104. Biometric template T 184 may include templates, such as minutiae and/or other information characterizing biometric prints of users, which may be used to authenticate the user each time the user would like to use secure area 102 and/or system 101. Registration key R 186 may be generated by applying a hash function to biometric print(s) and/or information derived from an unpredictable physical process, and may be used for generating passcode generators by perturbing the registration code or applying a hash code to the registration code. In one embodiment, the unpredictable physical process may use one or more phototransistors, each of which senses photons.

Current encryption key K 188 is the current encryption key, which may be stored long enough for the next encryption key to be generated from the current encryption key. Similarly, current passcode generator G 190 may stored long enough for generating the current passcode and the next passcode generator. The passcode generator is a value (e.g., a combination of various symbols and characters) that is combined with the transaction information, and a function may be applied to the combination to generate a passcode. Transaction information S 192 may include information about a transaction that the user would like to perform. Transaction information 190 may combined with the current passcode generator and to generate the current transaction passcode.

Service Provider System

Figure 2A:
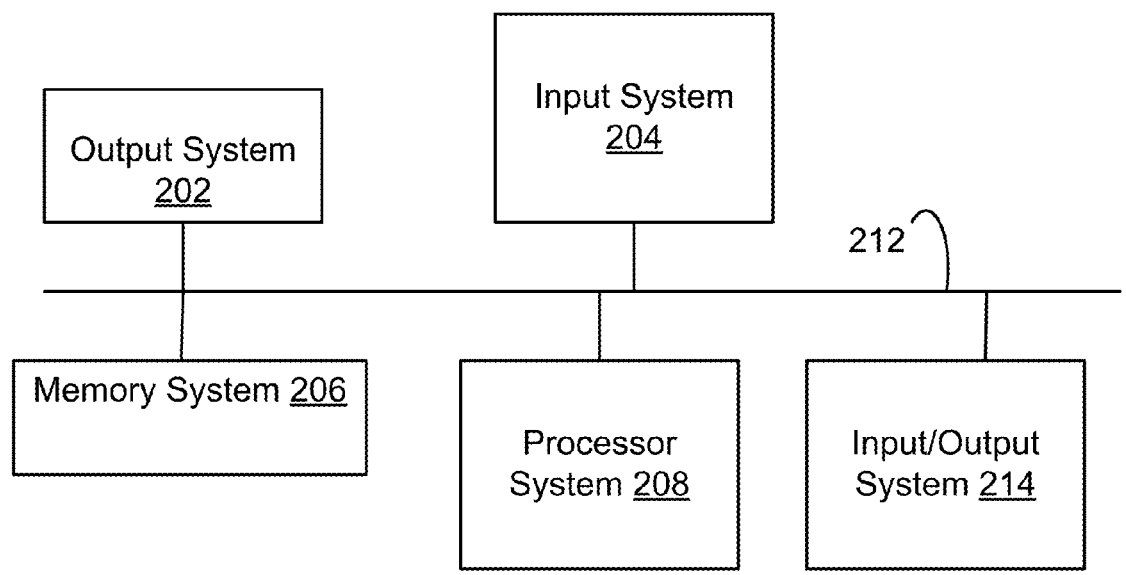
FIG. 2A shows a block diagram of an embodiment of a service provider system.

FIG. 2A shows a block diagram of an embodiment of a service provider system 200 in a system for securing transactions against cyber attacks. In an embodiment, service provider system 200 may include output system 202, input system 204, memory system 206, processor system 208, communication system 212, and input/output system 214. In other embodiments, the service provider system 200 may not have all the components and/or may have other embodiments in addition to or instead of the components listed above.

Service provider system 200 may be a financial institution or any other system such as a power plant, a power grid, or a nuclear plant or any other system requiring secure access. In an embodiment, service provider system 200 may be an embodiment of service provider system 126. Any place in this specification where service provider 126 is mentioned service provider 200 may be substituted. Any place in this specification where service provider 200 is mentioned service provider 126 may be substituted. Service provider system 200 may include one or more webservers, applications servers, and/or databases, which may be part of a financial institution, for example.

Output system 202 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 204 may include any one of, some of, any combination of, or all of a keyboard system, a touch sensitive screen, a tablet pen, a stylus, a mouse system, a track ball system, a track pad system, buttons on a handheld system, character entry of letters, numbers or other symbols on a touch sensitive screen, a scanner system, a microphone system, a connection to a sound system, and/or a connection and/or interface system to a computer system, intranet, and/or internet (e.g. IrDA, USB).

Memory system 206 may include may include, for example, any one of, some of, any combination of, or all of a long term storage system, such as a hard drive; a short term storage system, such as random access memory; a removable storage system, such as a floppy drive or a removable drive; and/or flash memory. Memory system 206 may include one or more machine-readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Memory 206 may include encryption/decryption code, generate passcode generator, and algorithms for authenticating transaction information, for example (memory 206 is discussed further in conjunction with FIG. 2B).

Processor system 208 executes the secure transactions on system 200. Processor system 208 may include any one of, some of, any combination of, or all of multiple parallel processors, a single processor, a system of processors having one or more central processors and/or one or more specialized processors dedicated to specific tasks. In an embodiment, processor system 208 may include a network interface to connect system 200 to user system 101 via network 124. In an embodiment, processor 208 may execute encryption and decryption algorithms, which may generate the passcode with which the transaction information was encrypted. In an embodiment, processor 208 may decrypt secure messages from user system 101 and/or encrypt messages sent to user system 101.

Communication system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves. In embodiment, memory system 206 may store instructions for system 200 to receive authenticated secure transaction information from user system 101.

Input/output system 214 may include devices that have the dual function as input and output devices. For example, input/output system 214 may include one or more touch sensitive screens, which display an image and therefore are an output device and accept input when the screens are pressed by a finger or stylus, for example. The touch sensitive screen may be sensitive to heat and/or pressure. One or more of the input/output devices may be sensitive to a voltage or current produced by a stylus, for example. Input/output system 118 is optional, and may be used in addition to or in place of output system 202 and/or input device 204.

Figure 2B:
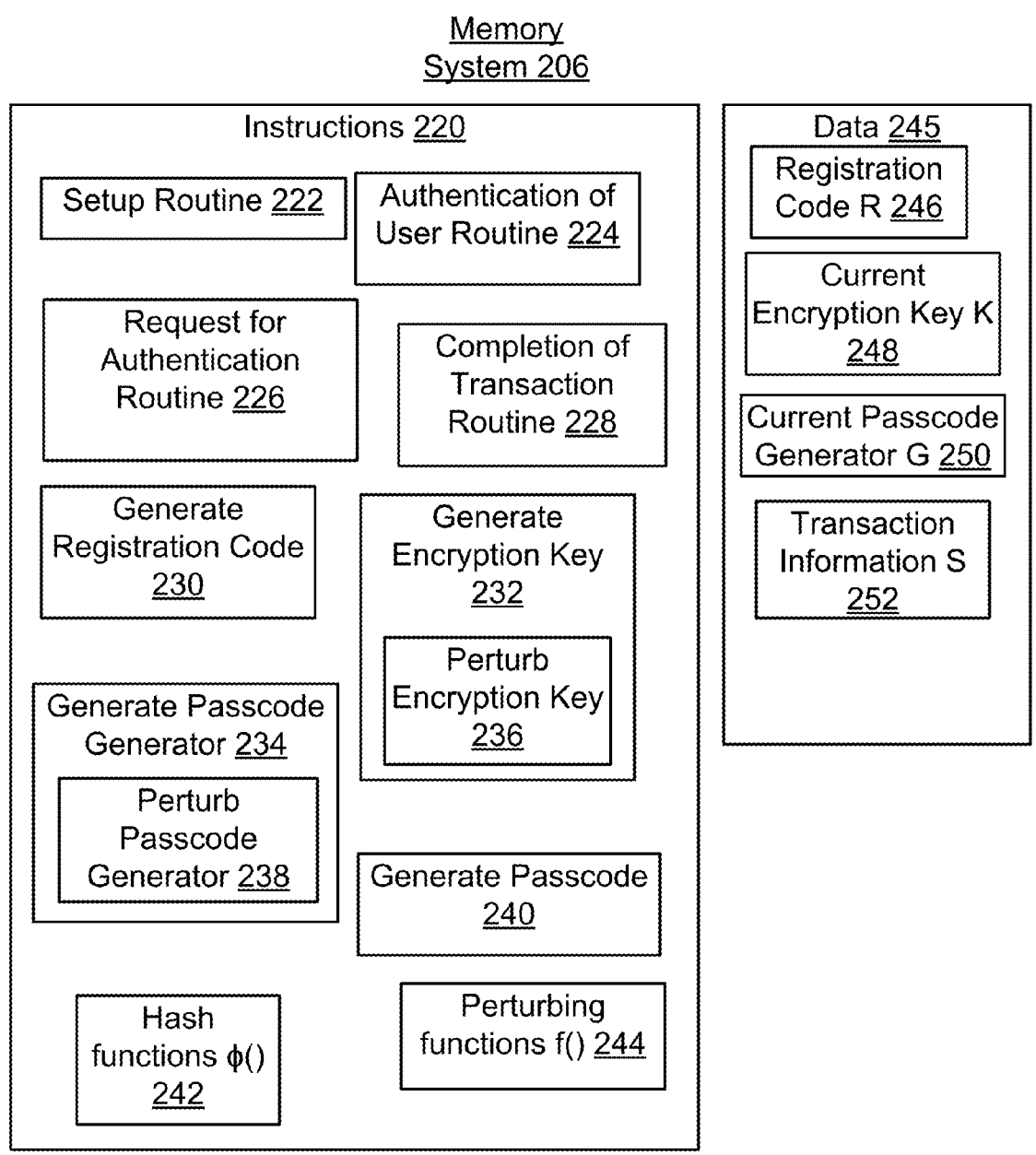
FIG. 2B shows memory system that is a component of the system in FIG. 2A.

FIG. 2B shows an embodiment of a block diagram of the contents of memory system 206 of FIG. 2A, Memory system 206 may include instructions 220, which in turn may include a setup routine 222, an authentication of user routine 224, a request for authentication routine 226, completion of transaction routine 228, generate registration code 230, generate encryption key 232, generate passcode generator 234, perturb encryption key 236, perturb passcode generator 238, generate passcode 240, hash functions 242, and perturbing functions 244. Memory system 206 may also store data 245, which may include registration code R 246, current encryption key K 248, current passcode generator G 250, and transaction information S 252. In other embodiments, memory system 206 may not have all of the elements or features listed and/or may have other elements or features instead of, or in addition to, those listed.

Setup routine 222 is a routine that handles the setting up of the service provider system 200, so that service provider system 200 may be used for performing secure transactions. Setup routine 222 may receive a registration code from the user system, which in turn may be used for generating the initial passcode and/or initial encryption key.

In an alternative embodiment, the user may send the biometric print or template of the biometric print to service provider system 200, and service provider system 200 may generate the registration code from the biometric print in the same manner that user system 101 generates the registration code from the template of the biometric print or from the biometric print and/or information obtained from an unpredictable physical process (e.g., by setup routine 222 applying a hash function to the biometric print and/or information derived from an unpredictable physical process).

In another embodiment, the user may visit the location of service provider, where the service provider may collect the biometric print or the user, which is used by service provider system 200 for creating the template of the biometric print, the registration code, and/or the initial encryption key. In this embodiment, user system 101 may obtain the biometric template, initial encryption key, and/or the registration code from service provider system 200 instead of the user system 101 collecting the biometric print, creating the biometric template, initial encryption key, and/or creating the registration code.

Authentication of user routine 224 may optionally receive and may process the initial request from initial request routine 160 of user system 101 to perform the transaction, which includes a passcode. Authentication of user routine 224 may decrypt the encrypted transaction information with the encryption key and generate the passcode from a combination of the current passcode generator and transaction information. If the passcode generated by service provider system 200 and the passcode received match from user system 101, then the user has been authenticated. If the passcode received and the passcode generated do not match, the process is terminated, and optionally an error message is sent to user system 101. During authentication of user routine 224, the passcode generator is perturbed (stored at service provider system 200) and the encryption key (stored at service provider system 200) is perturbed to obtain a new passcode generator and a new encryption key, respectively, so that the passcode generator and encryption key used by service provide system 200 is the same as (or sted differently is synchronized with) the passcode generator and encryption key used by user system 101. As with user system 101, an embodiment, each passcode is generated from a different passcode generator. In an embodiment, the passcode is generated from the passcode generator generated after generating the prior passcode, which may be generated any time after generating the prior passcode and before generating the current passcode, such as just after generating the prior passcode or just before generating the current passcode, so long as the passcode generator and encryption key of the service provider system 200 is the same as used by user system 101 for creating the passcode being authenticated.

After authentication of user routine 224 authenticates the passcode sent from user system 101, service provider system 200 needs to be authenticated by user system 101 (e.g., so that the user knows that the service provider is not an imposter and thereby protect against man-in-the-middle attacks). Authentication of service provider routine 226 creates a new passcode, which is sent to the user system 101 for authentication. As part of authentication of user routine 224, service provider 200 perturbs the passcode generator, and applies a function (e.g., a one-way hash function) the combination of the passcode generator and the transaction information (which generates the new passcode). In order for service provider system 200 to be authenticated, both service provider system 200 and user system 101 generate the new passcode from the same passcode generator and transaction information, and since the passcode generator is indirectly derived from the biometric print and in some embodiments indirectly derived from an unpredictable physical process. Since the transaction information is likely to vary with every transaction, the passcode is likely to be hard to duplicate by someone posing as the user or service provider.

After sending the passcode for authenticating the service provider, service provider system 200 waits for a reply, including a new passcode and transaction information, to complete the transaction. Upon receipt of the passcode and an encrypted message, user authentication routine 224 again authenticates user system 101 by decrypting the encrypted message to obtain the new transaction information, perturbing the generating of the new passcode by applying a one way function to the combination of the passcode generator and the transaction information, and comparing the new passcode generated and the new passcode received. If the passcode is determined to be authentic, completion of transaction routine 228 completes the transaction using the transaction information sent from user system 101 by initial request routine 160 and/or completion of transaction routine 164. The transaction information sent by initial request routine 160 and completion of transaction routine 164 may be the same or different. In an embodiment, the transaction information sent from user system 101 to service provider system 200 are not known in advance. In another embodiment, the transaction information used and/or sent during initial request routine 160 may be information that is already known by service provider system 200, while the transaction information sent during transaction routine 164 (which is after user system 101 and service provider system 200 authenticated one another) may include some transaction information that was previously unknown to the service provider 200. Initial request routine 160 may send a perturbation of a hash of an initial passcode and encrypted transaction information, to service provider system 200, and secure transaction routine 158 may wait for a reply, which will include a passcode that is dependent on the passcode generator and transaction information.

Generate registration code 230 is optional and may be the same as generate registration code 166. In an embodiment, both generate registration code 166 and 230 are present, and both user system 101 and service provider system 200 generate the registration code separately. Only one of generate registration code 230 and 166 is necessary, the registration code may be generated in one of user system 101 and service provider system 200, and sent to the other of user system 101 and service provider system 166, and in an embodiment of user system 101 and service provider system 166 does not generate the registration code.

Generate encryption key 232 are machine instructions that generate a new encryption key from (e.g., by applying a function, such as a perturbing function to) a prior encryption key. Generate encryption key 232 may be the same routine as generate encryption key 170 except that generate encryption key 232 is implemented at service provider 200 and generate encryption key 170 is implemented at user system 101. Generate passcode generator 234, which may be the same as generate passcode generator 172, are machine instructions that generate a new passcode generator from a prior passcode generator. In other words, generate passcode generator 234 may be an algorithm for generating a passcode generator from previous passcode generator. Generate passcode generator 234 may combine (e.g., concatenate) the prior passcode generator with current transaction information and apply a one-way function (e.g., a one-way hash function) to the combination or may perturb the prior passcode generator. Perturb encryption key 236 may be the same as perturb encryption key 174, and perturb encryption key 236 perturbs the current encryption key to thereby generate the next encryption key. Perturb passcode generator 238 may be the same as perturb encryption key 175, and perturb passcode generator 238 perturbs the current passcode generator to thereby generate the next passcode generator. Generate passcode 240 may be the same as generate passcode 176, and generate passcode 240 may generate a new passcode. Generate passcode 240 may generate the passcode by applying a hash function to a combination of (e.g., a concatenation of) the passcode generator and transaction information. Hash functions 242 may be the same as hash functions 178. Hash functions 242 may be one a way functions, which may be used by generate registration code 230. Hash functions 242 may be used to generate passcode 240. Hash functions 242 may be used for generating a registration code from a biometric print and/or information from an unpredictable physical process and/or other user information. Hash functions 242 may be used for generating a new passcode from the combination of a prior passcode and transaction. Optionally, hash functions 242 may include a different function for generate registration code 230 and generate passcode 240. Those hash function(s) of hash functions 242 that are used by authentication of user routine 224, request for authentication routine 226, and completion of transaction routine 228 may be the same as one another or different from one another. The perturbing functions in perturbing functions 244 used by perturb encryption key 236 and perturb passcode generator 238, and may be the same or different from one another. Different perturbing functions of perturbing functions 244 may be used during each of authentication of user routine 224, request for authentication routine 226, and completion of transaction routine 228. Although perturbing functions 244 and hash functions 242 are indicated as separate storage areas in from perturb encryption key 236 and perturb passcode generator 238, the perturbing functions may just be stored as part of the code for perturb encryption key 236 and perturb passcode generator 238.

Data 245 may include any data that is needed for implementing any of the routines stored in memory 206. Registration key R 246 may be the same as registration code 186 and may be generated by applying a hash function to biometric print(s) and/or information from an unpredictable physical process, and may be used for generating passcode generators by perturbing the registration code or applying a hash code to the registration code.

Current encryption key K 248 may be the same as current encryption key 188, and may be the current encryption key, which may be stored long enough for the next encryption key to be generated from the current encryption key. Similarly, current passcode generator G 250 may be the same as passcode generator G 190 and may stored long enough for generating the current passcode and the next passcode generator. The passcode generator is a value (e.g., a combination of various symbols and characters) that is combined with the transaction information, and a function may be applied to the combination to generate a passcode. Transaction information S 252 may be the same as transaction 192, and may include information about a transaction that the user would like to perform. Transaction information S 252 may combined with the current passcode generator and to generate the current passcode. Transaction information S 252 may be received from user system 101 and may be used to perform a transaction at service provider system 200 on behalf of user system 101.

FIGS. 3A, 3B, 3C and 4-6 show methods for different parts of a secure transaction. The methods of FIGS. 3A-3C and 4-6 may be implemented on system 100.

Setup of User System

Figure 3A:
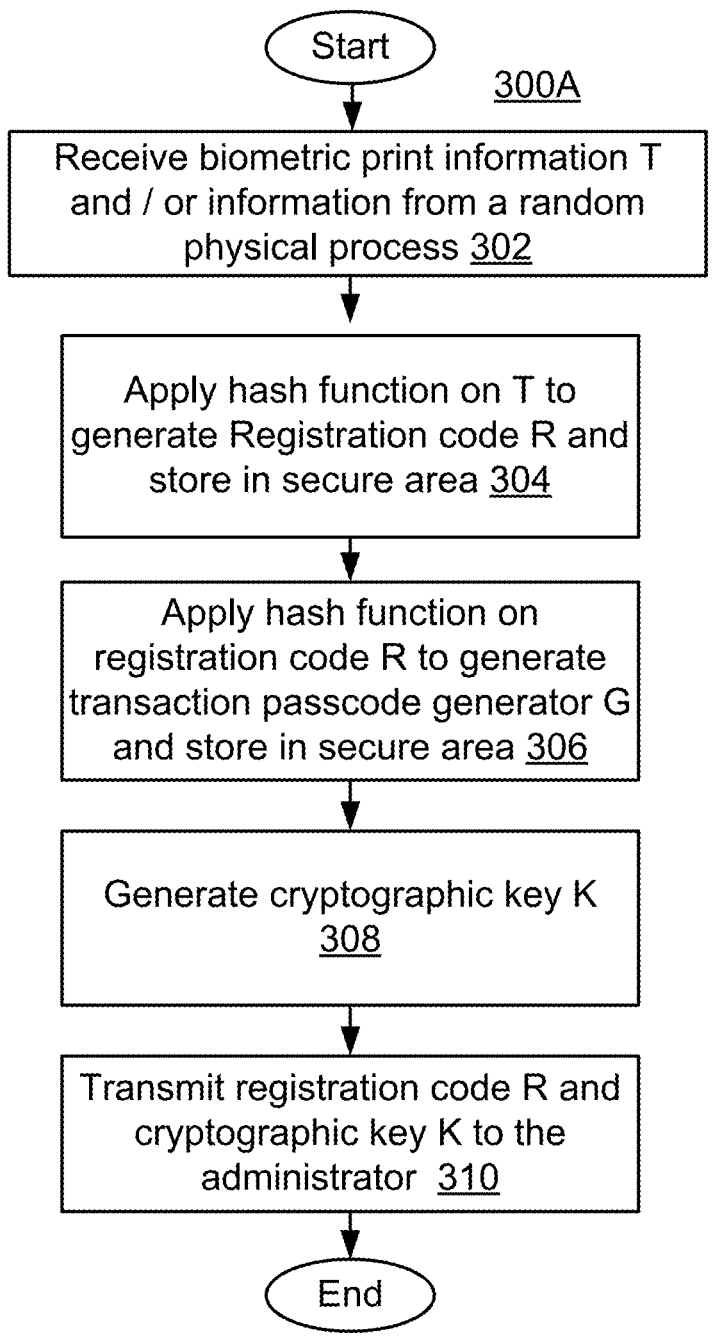
FIG. 3A shows a flow diagram of an embodiment of a user-side method of setting up a system before starting a secure transaction.

FIG. 3A shows a flowchart of an embodiment of method 300A of setting up user system 101 for securing transactions against cyber attacks. User system method 300A may be the setup performed by user system 101 before starting a secure transaction.

In step 302, the biometric print information may be obtained from the user from a biometric sensor 111 in input system 110. Method 300A may also collect other setup information, such as a Personal Identification Number (PIN), a password, and/or a sequence or collection of images that are easy to remember. The setup data that was collected may be denoted as a T.

In step 304, a hash function $\Phi$ or any other one way method is applied on the biometric print information and other collected data T. A hash function $\Phi$ is applied to T, one or more times denoted as $\Phi^k(T)$, to create the registration code R which may be stored in secure area 102. In other words, $R=\Phi^k(T)$. The registration code is a sequence of symbols. An example of a registration code with 16 symbols is "1Ae58GnZbk3T4 pcQ". A registration code in hex format may be used: "32DE0FA3908F100BBCEFFE3E4CB2382E376629E34 A11478291A09B2A3DFFEF." A registration code with punctuation and other symbols may also be used. An example of a registration code with 32 symbols is "1!56hs#KUD3_4xP*7:y21W=K;r.+4vN?". There is at least one unique registration code for each passcode generator. In at least one embodiment, more than one different hash function may be used so for example, SHA-1 may be applied to U one or more times and Keccak may be applied to W one or more times.

In step 306, transaction passcode generator G is computed. For example, transaction passcode generator G may be generated by applying a hash function $\Phi$ to registration code R. In other words, $G=\Phi(R)$. In an embodiment, in step 306 transaction passcode generator G may be stored in secure memory system 104. In this specification, passcode generator and transaction passcode generator may be used interchangeably. The transaction passcode generator G may be stored in secure memory system 104 and is a value (e.g., a number or sequence of symbols, such as alphanumeric characters) from which user system 101 may generate a one-time transaction passcode. For example, a one-way function may be applied to a combination of the transaction passcode generator G and transaction information to generate the one-time passcode. Each transaction code generator may be generated from a prior transaction passcode generator, by applying a function to the prior passcode generator. In an embodiment, both the user system 101 and service provider system 126 separately generate each transaction passcode generator G and each one-way passcode.

In an alternative embodiment, the application of hash function $\Phi$ in step 306 may be skipped and the registration code is stored as an initial passcode generator.

In step 308, a cryptographic key K may be generated. In at least one embodiment, the biometric print information T is divided into two parts U, W. U may be used to generate the registration code R and W is used to help generate an encryption key K that the user's secure area and the administrator only have access to. Similarly, the registration code may be generated as $R=\Phi^k(U, I)$ and the encryption key may be generated as $K=\Phi^k(W, I)$ where I is information created from an unpredictable physical process. Alternatively, the registration R code may be generated from the biometric print, the initial transaction passcode generator may be generated from the registration code and each subsequent passcode generator may be generated from the prior transaction passcode generator. The transaction passcode generator may be used as the encryption key or may be generated by applying yet another one way function to the transaction passcode generator.

In step 310, the registration code R generated in step 306 and the cryptographic key K generated in step 308 may be securely transferred to service provider system 126. In an embodiment, the secure distribution of R and K may be performed by a Diffie-Hellman key exchange.

A Diffie-Hellman key exchange is a key exchange method where two parties (Alice and Bob) that have no prior knowledge of each other jointly establish a shared secret key over an unsecure communications channel. Before the Diffie-Hellman key exchange is described it is helpful to review the mathematical notion of a group. A group G is a set with a binary operation *, (g*g is denoted as $g^2$; g*g*g*g*g is denoted as $g^5$), such that the following four properties hold:
(i.) The binary operation * is closed on G. In other words, a*b lies in G for all elements a and b in G.
(ii.) The binary operation * is associative on G. a*(b*c)= (a*b)*c for all elements a, b, and c in G
(iii.) There is a unique identity element e in G. a*e=e*a=a.
(iv). Each element a in G has a unique inverse denoted as $a^{-1}$. $a*a^{-1}=a^{-1}*a=e$.

The integers { ..., -2, -1, 0, 1, 2, ... } with respect to the binary operation + are an example of an infinite group. 0 is the identity element. For example, the inverse of 5 is -5 and the inverse of -107 is 107.

The set of permutations on n elements {1, 2, ..., n}, denoted as $S_n$, is an example of a finite group with n! elements where the binary operation is function composition. Each element of $S_n$, is a function p:{1, 2, ..., n}→{1, 2, ..., n} that is 1 to 1 and onto. In this context, p is called a permutation The identity permutation e is the identity element in $S_n$, where $e(k)=k$ for each k in $\{1, 2, \ldots, n\}$.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups.

The integers modulo n (i.e., $Z_n=\{[0], [1], \ldots [n-1]\}$ are an example of a finite group with respect to addition modulo n. If n=5, [4]+[4]=[3] in $Z_5$ because 5 divides (4+4)−3. Similarly, [3]+[4]=[3] in $Z_5$. Observe that $Z_5$ is a cyclic group because 5 is a prime number. When p is a prime number, $Z_p$ is a cyclic group containing p elements $\{[0], [1], \ldots [p-1]\}$. [1] is called a generating element for cyclic group $Z_p$ since $[1]^m=[m]$ where m is a natural number such that $0<m\leq p-1$ and $[1]^p=[0]$. This multiplicative notation works as follows: $[1]^2=[1]+[1]$; $[1]^3=[1]+[1]+[1]$; and so on. This multiplicative notation (i.e. using superscripts) is used in the description of the Diffie-Hillman key exchange protocol described below.

There are an infinite number of cyclic groups and an infinite number of these cyclic groups are extremely large. The notion of extremely large means the following: if $2^{1024}$ is considered to be an extremely large number based on the computing power of current computers, then there are still an infinite number of finite cyclic groups with each cyclic group containing more than $2^{1024}$ elements.

Steps 1, 2, 3, 4, and 5 describe the Diffie-Hellman key exchange.
1. Alice and Bob agree on an extremely large, finite, cyclic group G and a generating element g in G. (Alice and Bob sometimes agree on finite, cyclic group G and element g long before the rest of the key exchange protocol; g is assumed to be known by all attackers.) The group G is written multiplicatively as explained previously.
2. Alice picks a random natural number a and sends $g^a$ to Bob.
3. Bob picks a random natural number b and sends $g^b$ to Alice.
4. Alice computes $(g^b)^a$.
5. Bob computes $(g^a)^b$.

Both Alice and Bob are now in possession of the group element $g^{ab}$, which can serve as the shared secret key. The values of $(g^b)^a$ and $(g^a)^b$ are the same because g is an element of group G.

Alice can encrypt a message m, as $mg^{ab}$, and sends $mg^{ab}$ to Bob. Bob knows |G|, b, and $g^a$. A result from group theory implies that the order of every element of a group divides the number of elements in the group, denoted as |G|. This means $x^{|G|}=1$ for all x in G where 1 is the identity element in G. Bob calculates $(g^a)^{|G|-b}=(g^{|G|})^a g^{-ab}=(g^{ab})^{-1}$. After Bob receives the encrypted message $mg^{ab}$ from Alice, then Bob applies $(g^{ab})^{-1}$ and decrypts the encrypted message by computing $mg^{ab}(g^{ab})^{-1}=m$.

The user and the service provider 126 agree upon a common key for the registration key. The user then encrypts one of the common keys with the registration key. The service provider 126 encrypts the common key with other information, which may be information specific to the user or a random number, for example. Then the user sends the encrypted common key (that was encrypted by the user with the registration) to the service provider 126, and the service provider 126 sends the encrypted common key that the service provider 126 encrypted to the user. Next, the user encrypts the encrypted common keys that was received from the service provider 126 with the registration key, and the service provider 126 encrypts the encrypted common key received from the user (which was encrypted with the registration key) with the same information that was used to encrypt the original copy of the common key of the service provider 126. Thus, both the user and the service provider 126 will now have the common encrypted key derived from the registration key supplied by the user and the information supplied by the service provider 126. The resulting encrypted common key may be used as the registration key (instead of the original registration key).

Optionally, the user system 101 and the service provider 126 may also agree upon a common key for the encryption key. The common key of the encryption key and registration key may be the same as one another or different. The user system 101 then encrypts one of the common keys and the encryption key. The server encrypts the common key with other information, which may be information specific to the user or a random number for example (as was done for the registration key). Then the user system 101 sends the encrypted common key (that was encrypted by the user with the encryption key) to the service provider 126, and the service provider 126 sends the encrypted common keys (which was encrypted service provider 126) to the user. Next, the user encrypts the encrypted common key that were received from the service provider 126 with the encryption key, and the service provider 126 encrypts the encrypted common keys received from the user (which was already encrypted with the encryption key by the user) with the same information that was used to encrypt the original copy of the common keys of the service provider 126. Thus, both the user and the service provider 126 will now have the common key encrypted by the encryption key supplied by the user and the information supplied by the service provider 126. The resulting encrypted common key may be used as the encryption key (instead of the original encryption key). Alternatively, the encryption key may be derived from the registration key by both the service provider 126 and user.

In other embodiments, the secure transmission may use elliptic curve cryptography which is similar to the Diffie-Hellman exchange described previously. In other embodiments, the secure transmission R and K may use a camera that reads a proprietary pattern that the portable device is able to display after setup is complete. In at least one embodiment, the registration code R may be given to the administrator in the same physical place, such as at a bank, or the registration code may be mailed or electronically transmitted to the administrator if setup is accomplished remotely. In some applications, the registration code may be encrypted first and then electronically transmitted or sent by mail. The service provider system 126 uses the registration code R to generate the encryption key (that service provider system 126 received), and is used to compute the passcode generator G as $G=\Phi^k(R)$ where $k\geq 0$ and stores transaction passcode generator G and encryption key K for a particular user in a secure area 102. The number k in the operator $\Phi^k(\ )$ is the number of times that the operator $\Phi(\ )$ is applied to R. In an embodiment, prior to creating each passcode a new passcode generator is generated from which the new passcode is generated by applying $\Phi(\ )$ to the prior value of the passcode generator and transaction information $S_k$. In other words, $G_n=f(G_{n-1})=f^2(G_{n-2})=f^3(G_{n-3})=\ldots=f^n(G_0)=f^n(\Phi^k(R))$, and $P_n=\psi(G_n, S_n)$ is the nth transaction passcode, where $\psi$ is another function, which may be the same or different than $\Phi$.

In an embodiment, each of the steps of method 300A may be a distinct step. In other embodiments, method 300A may not have all of the above steps and/or may have other steps in addition to or instead of those listed above. The steps of method 300A may be performed in another order. Subsets of the steps listed above as part of method 300A may be used to form their own method. In an embodiment, there could be multiple instances of method 300A, each performed in response to performing another transaction or another part of the same transaction. The multiple instances of method 300A may be performed sequentially (e.g., each sequential instance performing the next part of a sequence of transactions or of a sequence of operations making up a single transaction) or in parallel.

Setup of Service Provider

Figure 3B:
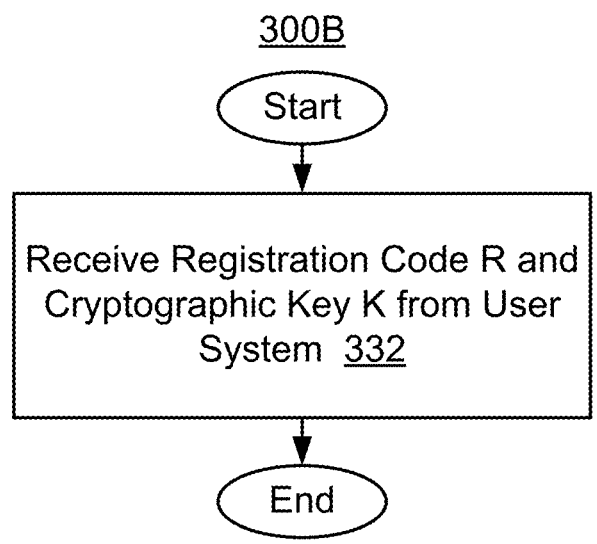
FIG. 3B shows a flow diagram of an embodiment of a service provider-side method of setting up a system before starting a secure transaction.

FIG. 3B shows a flowchart of an embodiment of method 300B of setting up service provider system 126 for secure transactions against cyber attacks. Service provider setup method 300B may be the setup performed by service provider 126 before starting a secure transaction procedure.

In a step 332, service provider 126 may receive registration code R, cryptographic key K along with user information such as name and account number. In another embodiment, service provider 126 generates the passcode and/or encryption key in parallel with user system 101 or instead of service provider 126.

In an embodiment, each of the steps of method 300B may be a distinct step. In other embodiments, method 300B may not have all of the above steps and/or may have other steps in addition to or instead of those listed above. The steps of method 300B may be performed in another order. Subsets of the steps listed above as part of method 300B may be used to form their own method. In an embodiment, there could be multiple instances of method 300B.

User System Method of Initiating the Transaction and Requesting Authentication

Figure 3C:
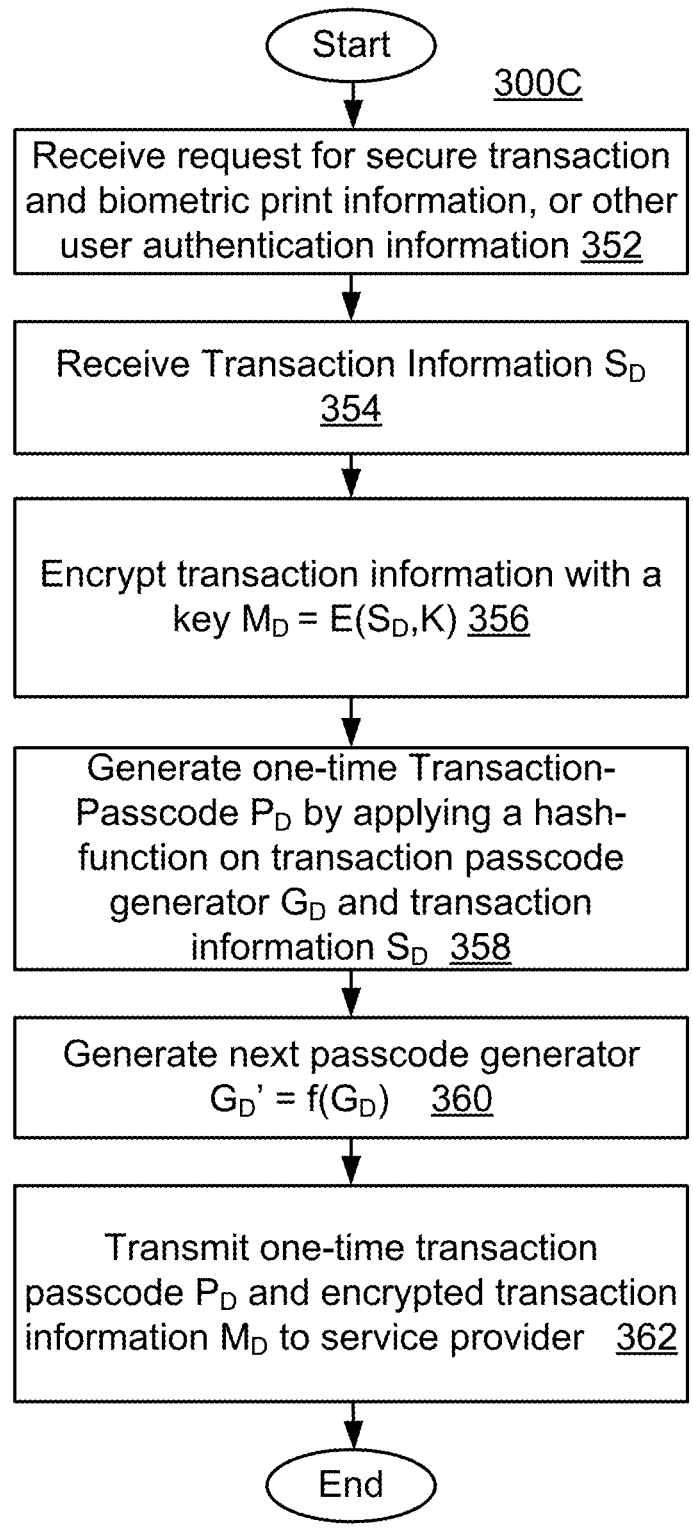
FIG. 3C shows a flow diagram of an embodiment of a user-side method of initiating a secure transaction.

FIG. 3C shows a flowchart of an embodiment of method 300C in system 100 for secure transactions against cyber-attacks. User system method 300C may be performed by user system 101 after the setup described in method 300A. Method 300C may be an embodiment of initial request routine 160 (FIG. 1B).

In step 352, user system 101 may receive a request from a user (via an interface on the user system 101) to start a secure transaction with service provider system 126. User system 101 may also receive biometric print information or other information from the user to authenticate the user. Processor system 116 may send a request to secure processor system 106 to authenticate the user with the information stored during setup. In this specification, the terms authenticate, verify, and validate (and their conjugations) may be interchanged with one another to obtain different embodiments.

In step 354, user system 101 receives transaction information from the user. The transaction information $S_D$ may be stored either in secure memory system 104. In an embodiment, the transaction information is only stored in encrypted form in secure memory system 104, and nowhere else. In another embodiment, the transaction information may be stored unencrypted in the secure area 102 and/or elsewhere. In this specification, transaction information refers to one or more items of information that describe the transaction. For a payment transaction, one item may be the name of the person or entity sending the money. Another item may be the name of the person or entity receiving the money. Another item may be the date. Another item may be the sender's (entity's) account number. Another item may the receiving person's (entity's) bank account number. Another item may be the sender's (entity's) routing number. Another item may be the receiving person's (entity's) routing number. Another item may the amount of money which may be expressed in dollars, Euros, Yen, Francs, Deutschmark or another currency.

In at least one embodiment, the transaction may be a stock trade. In these embodiments, the stock account number may be part of the transaction information. In at least one embodiment, the ticker symbol of the stock—for example, GOOG—being bought or sold may be part of the transaction information (or the name of a commodity or other item being purchased). The number of shares may be part of the transaction information. The price per share (or unit price) at which the person wishes to buy or sell the shares may be an item of the transaction information. If the stock purchase (or sale) is a limit order, then an indication that the stock purchase is a limit order may be an item of the transaction information. If the stock purchase (or sale) is a market order, then an indication that the purchase is a market order may be an item of the transaction information. The name of the stock account (e.g. Ameritrade, Charles Schwab, etc.) or broker may also be an item of the transaction information.

In step 356, the transaction information SD may be encrypted with a key K, as MD=E(SD, K), and optionally stored in secure memory system 104. In step 358, secure processor system 106 applies a hash function Φ to the first passcode generator GD stored in secure memory 104 (step 306) and the transaction information received SD in step 354 to generate a first onetime transaction-passcode PD. In other words, PD=Φ(GD,SD). The first transaction-passcode may be used once for the transaction SD, and the transaction passcode may be unique to every transaction and every use. The one-time transaction passcode PD, may be a sequence of symbols. In this specification passcode, transaction passcode, and one-time transaction passcode may be substituted one for another to obtain different embodiments. The one-time transaction passcode PD, may dependent on the transaction information SD. An example of a numeric passcode is "925438710". An example of a transaction passcode may be a sequence of hexadecimal "925438710". An example of a transaction passcode may be a sequence of hexadecimal numbers "3A 21 5B DE OF 99". An example of an alphanumeric passcode with 8 symbols may be "4zc8vNXA" and an example with 16 symbols including punctuation and other symbols is "&xL#WBq61!j$uS_m". In an embodiment, each time a user submits a valid biometric print to the passcode generator, a new one-time transaction passcode is created from the current passcode generator G. The service provider checks that the passcode is derived from one of the passcode generators in the database and the particular transaction information. In other embodiments, a new passcode is generated more frequently than every time a user submits a valid user authentication. For example, a new passcode may be generated every other time or on a random schedule that the user is unaware.

In step 360, the current passcode generator $G_D$ is altered to generate a new passcode generator, the next passcode generator, for creating the next transaction passcode in the next use of the transaction system. In other words, new $G_D'=f(G_D)$, where there are an infinite number of functions that f could be. In at least one embodiment, the new value of $G_D$ (the second passcode generator) can be updated to $f(G_D, S_D)$ where the new passcode generator (the second passcode generator) is dependent on the transaction information $S_D$. The function f will be referred to as the perturbing function. One possible perturbing function f could update the new transaction passcode generator to $\Phi(G_D, S_D)$. An alternative perturbing function f could add $\Phi(G_D, S_D)$ to $G_D$. Another possible perturbing function f could xor $G_D$ and $\Phi(G_D, S_D)$. Another possible perturbing function f could add 1 to G and permute the order of the symbols in $G_D$ using some randomly chosen permutation. Even another possible perturbing function f could add 1 to $G_D$, and then permute the bits in $G_D$. $G_D$ could be used as a seed for a deterministic "pseudo-random" number generator, which is used as f to generate a new $G_D$. In step 362, the one-time transaction passcode $P_D$ and encrypted transaction information $E(S_D, K)$ may be transmitted to a display or submitted directly to service provider 126. In at least one embodiment, the one-time transaction passcode $P_D$ may be encrypted before transmitting to the service provider 126 for additional security.

In an embodiment, the one-time transaction-passcode $P_D$ (e.g., the first one time passcode) and encrypted transaction information $M_D$ may be displayed to service provider system 126, when the user is in the same physical location as service provider system 126. In another embodiment, the user may transmit the one-time transaction-passcode $P_D$ over a telephone. In another embodiment, the user may submit the one-time transaction-passcode $P_D$ and encrypted transaction information $M_D$ to the web browser and use the Internet for transmission to service provider system 126. In another embodiment, the user may submit the one-time transaction-passcode $P_D$ and encrypted transaction information $M_D$ by some other electronic means such as a fax machine or an ATM machine.

In an embodiment, each of the steps of method 300C may be a distinct step. In other embodiments, method 300C may not have all of the above steps and/or may have other steps in addition to or instead of those listed above. The steps of method 300C may be performed in another order. Subsets of the steps listed above as part of method 300C may be used to form their own method. In an embodiment, there could be multiple instances of method 300C.

Figure 4:
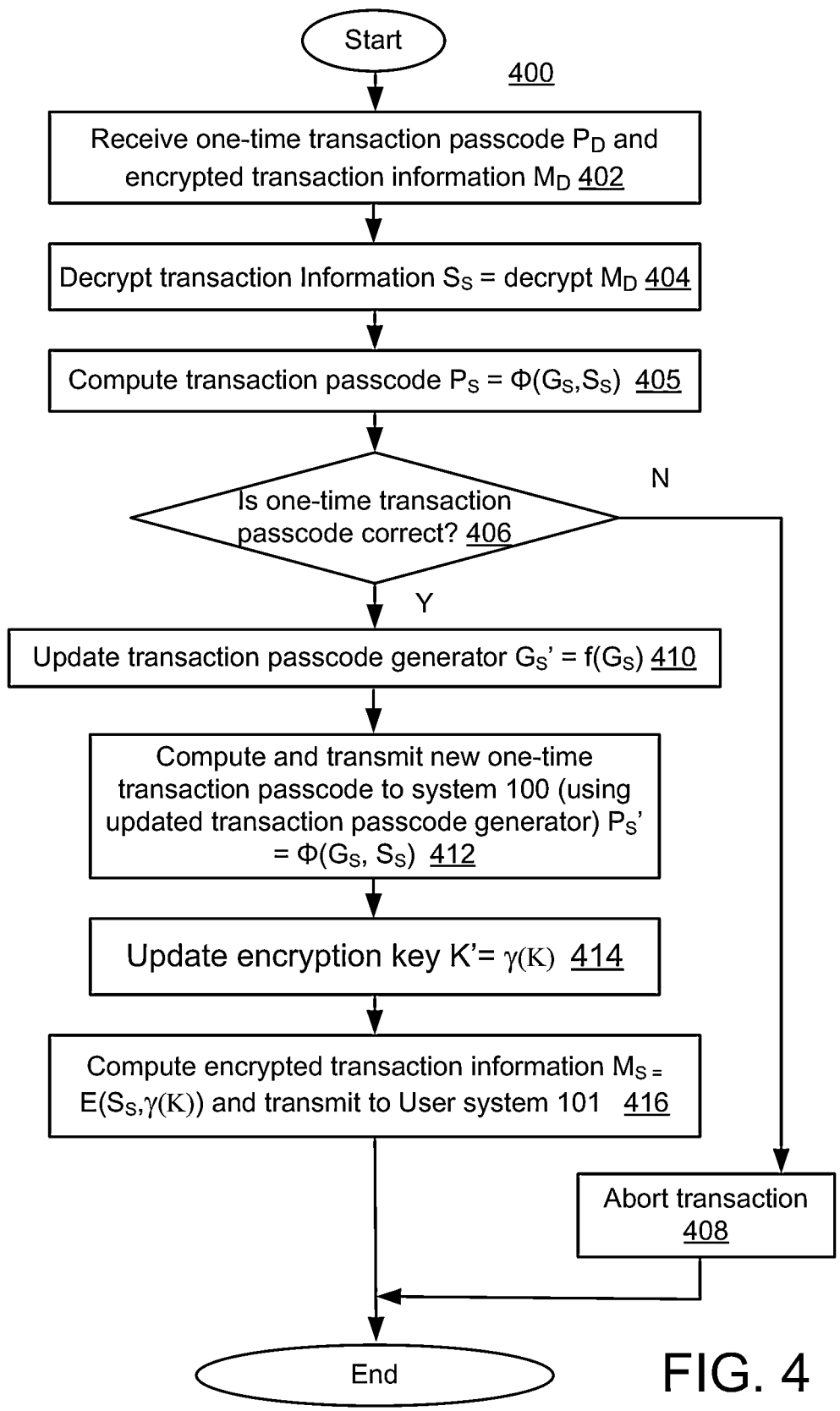
FIG. 4 shows a flow diagram of an embodiment of a service provider-side method of authenticating the user and requesting authentication.

Service Provider Method of Authenticating the User and Requesting Authentication FIG. 4 shows a flowchart of an embodiment of method 400 in a system 100 for securing transactions against cyber attacks, authenticating the user, and requesting authentication of the user to authenticate the service provider 126. Method 400 may be performed by service provider 126 upon a request to perform a secure transaction. Service provider 126 stores registration code R and encrypted key K during setup performed by method 300A. Method 400 may be an embodiment of a combination of authentication of user 224 and request for authentication routine 226 (FIG. 2B).

In step 402, service provider system 126 receives one-time transaction passcode $P_D$ and encrypted transaction information $M_D$, (sent in step 362). In step 404, service provider system 126 decrypts the transaction information using the stored encryption key K and applies the decryption function to $M_D$ to get $S_S$ according to $S_S$=decrypt $M_D$ with K. In step 405, service provider system 126 computes transaction passcode $P_D$ based on the passcode generator and received transaction information $S_S$, and computes the next passcode generator based on the prior transaction passcode generator $G_{S-1}$, as $G_S=\Phi(G_{S-1})$; and transaction passcode $P_S=\Phi(G_S, S_S)$. In step 406, method 400 compares the received one-time passcode $P_D$ and computes one-time passcode $P_S$. If the received one-time passcode and computed one-time passcode do not match, then method 400 proceeds to step 408. In step 408, service provider system 126 aborts the transaction. Returning to step 406, if the received one-time passcode and computed one-time passcode match, then method 400 proceeds to step 410. In step 410, service provider system 126 updates the transaction passcode generator $G_S$ to the next transaction passcode generator $G_S'$ by applying a hash function, $G_S'=f(G_S)$, where f may be the same as, or different from, $\Phi$. In step 412, service provider system 126 computes a new one-time transaction-passcode $P_S'$ using the updated transaction passcode generator $G_S'$, the system computes $P_S'=t(G_S', S_S)$. The new one-time transaction-passcode $P_S'$ is transmitted to user system 101. In step 414, the encryption key K may be updated using methods similar to updating transaction passcode generator. In other words, updated encryption key $K'=\gamma(K)$. Step 414 is optional. In step 416, the encrypted transaction information is computed as $M_S=E(S_S, \gamma(K))$ and sent to user system 101. Steps 402-410 may be an embodiment of a combination of authentication of user 224, and steps 412-416 may be an embodiment of request for authentication routine 226 (FIG. 2B). The generation of the new passcodes and new passcode generator sent to the user may be performed as part of authentication of user 224 or request for authentication routine 226 (FIG. 2B).

In an embodiment, each of the steps of method 400 may be a distinct step. In other embodiments, method 400 may not have all of the above steps and/or may have other steps in addition to or instead of those listed above. The steps of method 400 may be performed in another order. Subsets of the steps listed above as part of method 400 may be used to form their own method. In an embodiment, there could be multiple instances of method 400.

Figure 5:
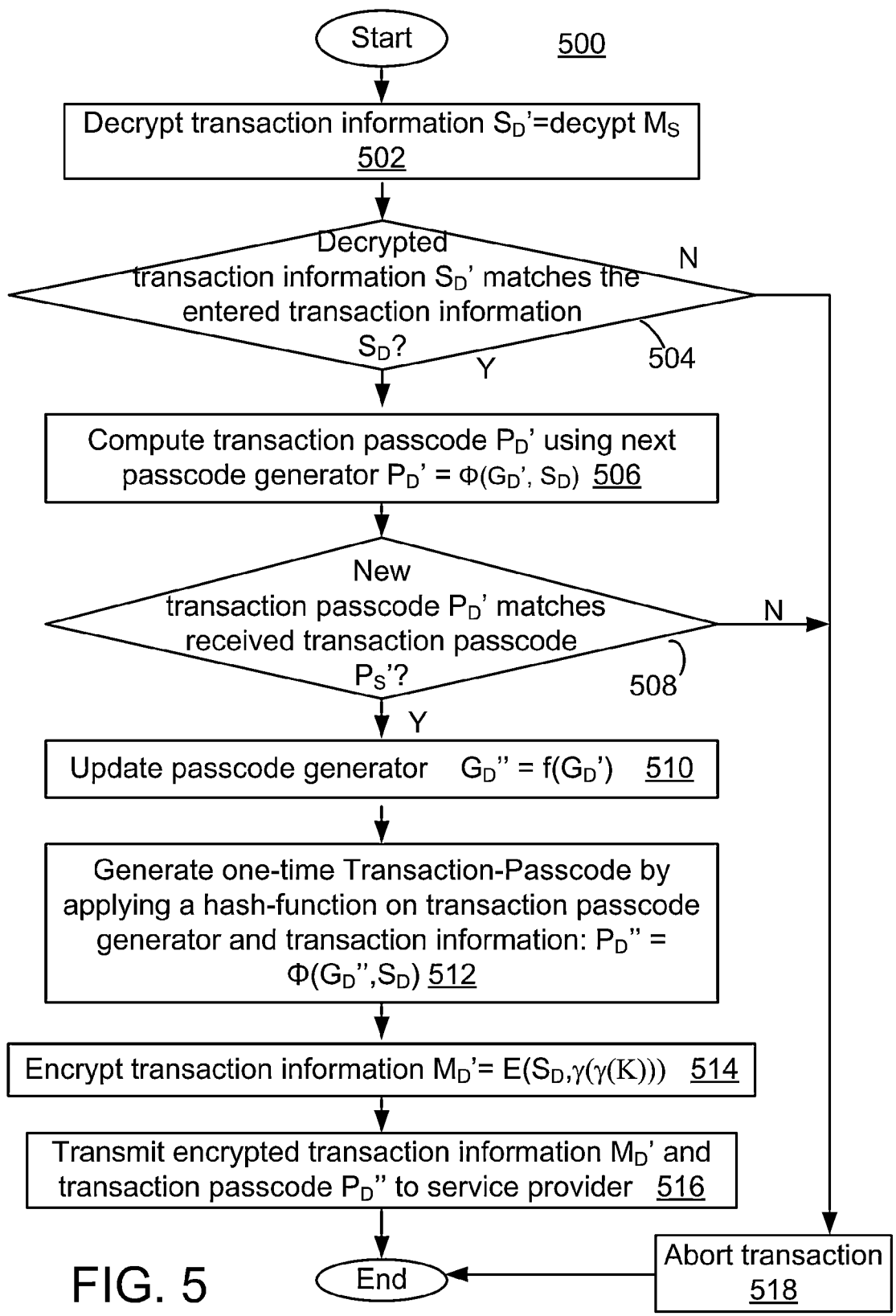
FIG. 5 shows a flow diagram of an embodiment of a user system-side method of authenticating the service provider and requesting completion of the transaction.

User System Method of Authenticating the Service Provider and Requesting Completion of the Transaction FIG. 5 shows a flowchart of an embodiment of method 500 in a system for authenticating the service provider and requesting completion of the transaction, for securing transactions against cyber attacks. Method 500 may be performed by user system 101 after receiving transaction passcode $P_S'$ and encrypted transaction information $M_S$ from service provider system 126 after method 300C. Method 500 may be an embodiment of authentication of service provider routine 162.

Method 500 verifies that user system 101 is communicating to the correct service provider system by checking the next passcode and further verifies that the transaction information has not changed by decrypting the received transaction information $S_D'$=Decrypt $E(S, \gamma(K))$ and checks that the service provider system knows that the transaction information is still $S_D$. If the verification or check is invalid, then the transaction is aborted. In an embodiment, although transaction information may initially be sent as part of method 300C, the transaction is not committed as a result of method 300C, but instead is committed on the basis of the transaction information sent in method 500. Method 500 is an embodiment of authentication of service provider 162.

In step 502, the transaction information $M_S$ (sent from service provider 126 in step 416) is decrypted, $S_D'$=decrypt $M_S$. In step 504, the decrypted transaction information $S_D'$ is compared with the stored transaction information $S_D$ (stored in step 354) to further verify whether the service provider system 126 received the correct transaction information. If the received (and optionally decrypted) transaction information does not match the stored (and optionally decrypted) transaction information, method 500 proceeds to step 518. If the received and generated second transaction passcode match and/or the received and stored transaction information match, method 500 proceeds to step 506. In step 506, user system 101 computes the next transaction passcode $P_D'=\Phi(G_D', S_D)$ (the second transaction passcode) using the next transaction passcode generator $G_D'$ (computed in step 360) unless the next transaction passcode was already computed in method 300C. In an embodiment, the next transaction passcode (the second transaction passcode) is only generated just before the next transaction passcode is needed (e.g., milliseconds before the next transaction passcode is needed) and then deleted immediately after use so that the transaction passcode never exists for more than a few millisecond or for more than a few seconds. In step 508, the received transaction passcode $P_S'$ (computed in step 412 and sent from service provider system 126) is compared with the computed (or generated) transaction passcode $P_D'$ to verify that user system 101 is communicating with service provider 126. If the passcodes do not match, then method 500 proceeds to step 518. In step 510, the passcode generator is updated by user system 101 for the third time, $G_D''=f(G_D')$ or $G_D''=f(S_D, G_D')$. In step 512, the next (or third) one time transaction passcode $P_D''$ is computed by applying a hash function on the transaction passcode $G_D''$ and transaction information $S_D$, $P_D''=\Phi(G_D'', S_D)$. In step 514, encrypted transaction information $M_D'=E(S_D, \gamma(K)))$ is computed (optionally, if the transaction information was stored in encrypted form, encrypted with the first encryption key, the transaction information is first decrypted with the first encryption key prior to being encrypted with the third encryption key, if necessary). In step 516, the encrypted transaction information $M_D'$ (now encrypted with the third encryption key) and the transaction passcode $P_D''$ (the third transaction passcode) are transmitted to service provider system 126. As mentioned above, in step 508, if the decrypted transaction information does not match the stored transaction information, method 500 proceeds to step 518. In step 518, method 500 aborts the transaction which may be due to a mismatch in transaction passcode or a mismatch of transaction information.

In an embodiment, each of the steps of method 500 may be a distinct step. In other embodiments, method 500 may not have all of the above steps and/or may have other steps in addition to or instead of those listed above. The steps of method 500 may be performed in another order. Subsets of the steps listed above as part of method 500 may be used to form their own method. In an embodiment, there could be multiple instances of method 500.

Service Provider Method of Completing the Transaction

Figure 6:
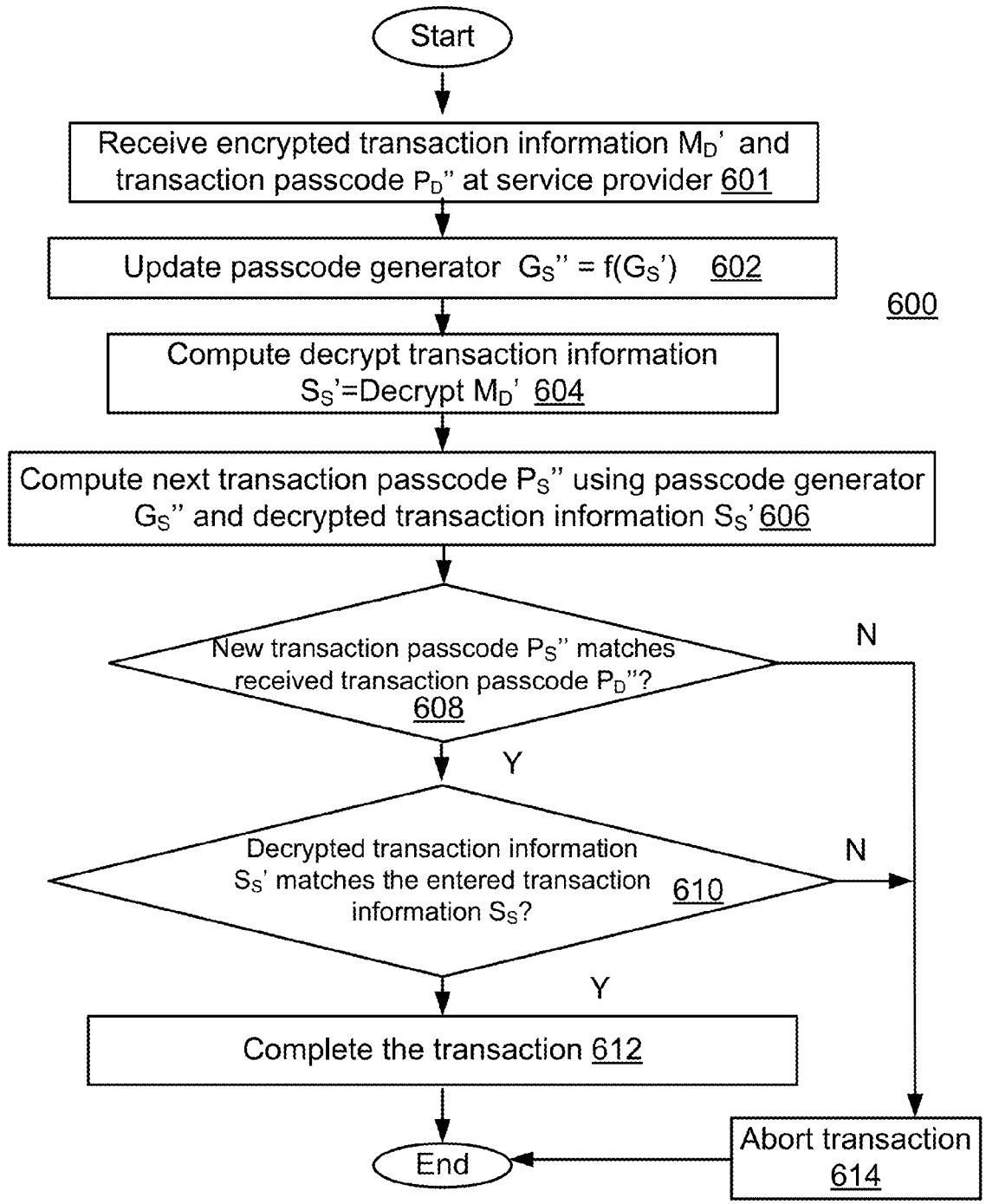
FIG. 6 shows a flow diagram of an embodiment of a service provider system-side method of completing the transaction.

FIG. 6 shows a flowchart of an embodiment of method 600 in a system for completing secure transactions against cyber attacks. Method 600 may be performed by service provider system 126 after receiving one-time transaction passcode $P_D''$ and encrypted transaction information $M_D'$ (after step 516). Method 600 may be an embodiment of completion of transaction routine 228.

In step 601, method 600 receives the transaction passcode and encrypted transaction information for the second time (which were sent in step 516 of method 500, FIG. 5). In step 602, passcode generator is updated by applying a function on the previous passcode generator, $G_S''=f(G_S')$. In step 604, method 600 decrypts the received transaction information (sent from user system 101 in step 516), $S_S'=\text{Decrypt}(M_D')$. In step 606, the next transaction passcode is computed by applying a hash function to a combination of the updated passcode generator of step 602 and transaction information $S_S'$, to create transaction passcode $P_S''=\Phi(G_S'', S_S')$. In step 608, the received transaction passcode $P_D''$ (sent from user system 101 in step 516) is compared with the computed transaction passcode $P_S''$ to verify that service provider 126 is communicating with the correct user system 101. If the passcodes do not match, method 600 proceeds to step 614 where the method 600 terminates. In step 610, method 600 compares the decrypted transaction information $S_S'$ with the stored transaction information $S_S$ (stored in step 354) to further verify whether the service provider system 126 received the correct transaction information. If the decrypted transaction information does not match the stored transaction information, method 600 proceeds to step 614 where the method terminates. In step 612, service provider 126 completes the transaction requested by user system 101. Method 600 transfers control to step 614 from either step 608 or step 610. In step 614, method 600 aborts the transaction which may be due to an invalid transaction passcode or a mismatch in transaction information.

In an embodiment, each of the steps of method 600 may be a distinct step. In other embodiments, method 600 may not have all of the above steps and/or may have other steps in addition to or instead of those listed above. The steps of method 600 may be performed in another order. Subsets of the steps listed above as part of method 600 may be used to form their own method. In an embodiment, there could be multiple instances of method 600.

Methods 300B, 400, 500 and 600 may be repeated every time the user would like perform a transaction, and the passcode, passcode generator, and optionally the encryption key are further updated to new values as a result of the repetition.

In methods 300B, 400, 500, and 600, although the transaction information sent always pertains to the same transaction (until that transaction is committed) different the transaction information may be sent each time the user sends transaction information to the service provider, so long as the service provider receives all the transaction information the second time the passcode and transaction information are sent (prior to the completing the transaction).

FIG. 7 shows a diagram of a browser showing the recipient information being entered into the web browser. In at least one embodiment, it may be more convenient for part of the transaction information T to be entered into the web browser and part of the transaction information S will come from the secure area. In at least one embodiment, transaction information T for the recipient may be entered directly into the web browser. Transaction information may contain the recipient's name on the account; the name of the bank or financial institution; the recipient's account number and other important items such as the routing number. In at least one embodiment, the user's transaction information S may be entered into the secure area of the device during setup (enrollment). This may occur when the bank or financial account is opened. The user's transaction information S may be entered after the account is opened at the financial institution or remotely on the device.

Alternative Embodiment Using Time (Implemented in System 100): Setup

During setup, in the secure area 102, biometric print information obtained from the user and in at least one embodiment unpredictable noise received from the hardware in the secure area 102 is passed to a one-way hash function $\Phi$ or another one way method. In one embodiment, the unpredictable noise may come from a physical process using one or more photo-transistors. The unpredictable noise and/or biometric data is used by the user system 101 to generate a seed $\sigma$ and in at least one embodiment a cryptographic key K. Then seed $\sigma$ and key K are securely transmitted to the administrator. The secure distribution of seed $\sigma$ and cryptographic key K may be performed by a Diffie-Hellman key exchange. Alternatively, service provider system 126 may generate $\sigma$ and key K from biometric data and/or unpredictable noise (e.g., while the user visits the offices of the service provider), and the seed and key are sent from service provider 126 to user system 101. In at least one embodiment, the distribution and transmission of seed σ and cryptographic key K may use elliptic curve cryptography for creating the cryptographical key K and/or for the encryption used in the Diffie-Hellman key exchange. In at least one embodiment, the secure transmission of seed σ and encryption key K may use a camera that reads a proprietary pattern that the portable device is able to display after setup is complete.

In at least one embodiment, the seed σ may be given to the administrator in the same physical place, such as at a bank, or the seed may be mailed or electronically transmitted to the administrator if setup is accomplished remotely. In some applications, the seed may be encrypted first and then electronically transmitted or sent by mail. Throughout this specification the term administrator and service provider 126 may be interchanged to obtain different embodiments and terms of use. Throughout this specification user system 101 and user may be substituted one for another to obtain different embodiments except in discussion of the user interacting with user system 101.

Setup (User Registration)

During setup, the user presents user information, which may include his/her biometric attributes one or more times to a sensor. Setup may also request the user to present information that he or she knows. The information that the user knows may be a PIN, password, or a sequence or collection of images that are easy to remember. At the end of setup, the following steps are executed:

Step 1.) Biometric print information, unpredictable noise from hardware in the secure area and other items (e.g., images, PIN, etc.) obtained from the setup, denoted as user information T, are used to create a seed σ. A hash function Φ is applied to user information T, one or more times denoted as $\Phi^k(T)$, to create the seed σ. In other words, $\sigma=\Phi^k(T)$. In at least one embodiment, user information T is divided into two parts U, W as described in the previous section and U is used to generate the seed and W is used to generate an encryption key K, which the user's secure area and the administrator only have access to. Similarly, the encryption key may be generated by applying the hash function one or more times to the other part of the user information W one or more times (which may be written as $K=\Phi^j(W)$). In at least one embodiment, more than one type of hash function may be used so for example, SHA-1 may be applied to one part of the user information U one or more times and Keccak may be applied to the other part of the user information W one or more times.

Step 2.) The seed σ and the cryptography key K are transmitted to a passcode display or possibly encrypted and wirelessly transmitted to the administrator.

Step 3.) The seed σ is securely displayed to the administrator in the same physical place or possibly decrypted by the administrator if received from a remote location and stored in a secure area maintained by the administrator.

Securely Executing a Financial Transaction

When a transaction is requested by the person, after a valid biometric print match occurs or a valid verification of other user items such as password, PIN, or images at user system 101, in at least one embodiment, there are transaction steps A, B, and C, which make up a successful transaction. Steps A, B, and C help prevent an un-trusted browser attack or other cyberattack from compromising the transaction.

Transaction Step A.

The person (user) securely enters transaction information into the secure area 102 of his device (e.g., user sytem 101) and the transaction information is securely transmitted to the backend administrator (user's bank account that verifies the person and executes the transaction) (e.g., at service provider 126).

A.1 The person selects and enters transaction information I into the secure area 102 of user system 101.

A.2 Transaction information I is encrypted in secure area 102 with key K denoted as E(I, K). A.3. The transaction seed σ is retrieved or reconstructed from a secure area 102.

A.4 The current time $\tau_1$ is read.

A.5 A hash function Φ is applied to transaction seed σ and transaction information I, denoted as $\Phi(\sigma, I, \tau_1)$, to create the one-time transaction passcode P. In other words, $P=\Phi(\sigma, I, \tau_1)$.

A.6 The one-time transaction passcode P and encrypted transaction information E(I, K) may transmitted from user system 101 to a display or submitted directly to the administrator at service provider system 126. During transmission, in some embodiments P may be encrypted for additional security. There are many different methods for transmitting the passcode and encrypted transaction information to the administrator (bank) at service provider system 126. In one method, the passcode and encrypted transaction information may be displayed to the administrator, when the user is in the same physical location as the administrator. In a second method, the user may wirelessly transmit the passcode via a mobile phone to service provider system 126. In a third method, the user may submit the passcode and encrypted transaction information to the web browser of user system 101 and use the Internet for transmission to the administrator (bank) at service provider system 126. In many other methods, the user may submit the passcode and encrypted transaction information by some other electronic means, such as a fax machine or an ATM machine. In at least one embodiment, the current time $\tau_1$ is determined and rounded to the nearest minute, for example. Optionally, the sender and receiver may compute the difference in time between the clock of the sender and the clock of the receiver prior to sending a message in case the two clocks are not sufficiently synchronized. In other embodiments, the time may be rounded to the nearest 5 minutes, the nearest, 10 minute, or the nearest hour, for example. Here the reference time is GMT time. For example, if the exact time is 19:05 and 45 seconds, then $\tau_1$ is set to is 19:06 pm.

In other embodiments, the current time $\tau_1$ is determined and rounded to the nearest 90 second. In other embodiments, the current time $\tau_1$ is determined and rounded to the nearest 5 minutes. In these embodiments, if the exact time is 6:07 and 57 seconds, then $\tau_1$ is set to 6:10. In at least one embodiment, the administrator (e.g., via service provider system 126) verifies the transaction passcode and verifies the encrypted transaction information and then executes this transaction if the transaction passcode is valid based on the decrypted transaction information, the same seed and the current time. In this specification the words "valid" and "authenticated" and their conjugations may be substituted one for another to obtain different embodiments. If the transaction passcode is determined to not be correct, or the decrypted transaction information is unreadable, then the transaction is aborted. In other embodiments, the administrator continues with transaction steps B and C before the transaction is executed.

Transaction Step B.

The administrator (bank) receives at service provider system 126 the encrypted transaction information and one-time transaction passcode. The administrator decrypts the transaction information and checks that the one-time transaction passcode is correct (e.g., the decrypted transaction information, the seed, and the time at which the passcode was generated are encrypted with a one-way hash function thereby computing the passcode, and the computed passcode is compared to a newly sent passcode to determine if there is a match.). If the one-time transaction passcode received from the user is not correct (e.g., if the sent passcode does not match the computed passcode), the transaction is aborted, and no transaction occurs. If the one-time transaction passcode received from the user is correct (e.g., if the sent passcode matches the computed passcode), then the administrator sends a new transaction passcode back to the user. The new passcode may be computed by optionally applying a function f to the seed $\sigma$ to form $f(\sigma)$ and applying a hash function to the combination of $f(\sigma)$, transaction information I, time $\tau_2$, as $P'=\Phi(f(\sigma), I, \tau_2)$, where $\tau_2$ is the new current time read by the administrator (at service provider system 126). In at least one embodiment, the function is not applied to the seed $\sigma$, the new passcode is generated by applying a hash function to the combination of the seed $\sigma$, transaction information I, time $\tau_2$, as $P'=\Phi(\sigma, I, \tau_2)$, which is a specific case of the prior expression for computing the new passcode in which, $f(\sigma)=\sigma$. In other embodiments, f is a function that both the user and administrator both know.

In at least one embodiment, the encryption key K may be updated, denoted as $\gamma(K)$, using similar methods to the update of the transaction passcode generator. Then the encrypted transaction information $E(I, \gamma(K))$ or $E(I, K)$ is sent from the administrator (bank) back to the user. (Updating the encryption key K helps address sniffing and replay attacks.)

Transaction Step C.

The user, via user system 101, verifies that he or she is communicating to the correct administrator (bank) at service provider system 126 by checking the next passcode $\Phi(f(\sigma), I, \tau_2)$ based on the user's current time and the user's seed. The user, via user system 101, further verifies that the transaction information has not changed by decrypting $E(I, \gamma(K))$ or decrypting $E(I, K)$ and checks that the administrator knows that the transaction information is still I. In some embodiments, the user may check the transaction information and associated transaction passcode by reading them from a display screen that can only be accessed by the secure area. If the verification or check are invalid, then the transaction is aborted. The user submits a new transaction passcode $\Phi(f(f(\sigma)), I, \tau_3))$ and also $E(I, \gamma(\gamma(K)))$ back to the administrator. If these values received by the administrator, at service provider system 126, are valid, the transaction is successfully executed by service provider system 126. Otherwise, the administrator (bank), via service provider system 126, aborts the transaction.

Speed Improvements for Many Users

In at least one embodiment, there may be many users for the administrator to keep records of. For these embodiments, the administrator can speed up the search process, by replacing previous steps by the following:

The administrator uses an index U or other identifier associated with transaction passcode P, and uses index U to find the corresponding passcode generator G. Alternatively a user identifier may be sent as a separate data item to the administrator. (The passcode generator for each user can be indexed by the user number or index U in a database.) The administrator applies a hash function $\Phi$ to $G_U$, S denoted as $\Phi(G_U, S)$, and compares it to P.

If $\Phi(G_U, S)$ equals P, then the transaction passcode submitted by the field user is valid, and the passcode generator is set equal to the new value of G', generated by applying the perturbing function to G, i.e. $G'=f(G, S)$ or $G'=f(G)$ depending on the embodiment.

Reducing User and Transmission Errors

If a user is reading the one-time transaction passcode from a display, sometimes the user may incorrectly read the one-time passcode or incorrectly write the one-time passcode down. Alternatively, the user may forget to record the one-time transaction passcode, or the user may type the one-time passcode into a keyboard incorrectly or the wireless transmission (or other transmission) may flip one or more bits which cause the one-time transaction passcode received by the administrator to be invalid. In any of these cases, the user may present biometrics or other authentication items again, and user system 101 will generate a new transaction passcode updating the passcode generator and passcode, whereas since the transaction as not successful, service provider system 126 will not update the passcode generator and passcode. As a result, user system 101 and service provider system 126 may be out of synchronization. Although user system 101 may be configures so as to revert back to the prior passcode and passcode generator is the transaction does not complete, another error may occur causing the passcode and passcode generator at user system 101 to be out of synchronization with the passcode and passcode generator at service provider system 126. To handle this situation, user system 101 and/or service provider system 126 may be capable of specifying a particular passcode generator according to the number of times (k) that $\Phi$ or f is applied. In an embodiment the k that is specified should be large enough to ensure that the same passcode is never used twice.

As an example, in at least one embodiment, if the last passcode successfully submitted was the $101^{st}$ passcode (or some other number passcode, N1), then the administrator may request the $119^{th}$ passcode (or yet another number passcode, N2) and the user will send the $119^{th}$ passcode (or the N2 passcode). In at least one embodiment, the passcode requested may be encrypted. In at least one embodiment, if the user has already generated a number of passcodes up to the $124^{th}$ passcode (or another number passcode, N3) and the passcode requested by the administrator is not greater than the current one to be generated by the user, i.e., 124 (or N3), the user may communicate to the administrator, please request a passcode greater than $124^{th}$ passcode (N3). In this case, the administrator may request the $1001^{st}$ passcode from the user (or another number passcode N4, where N1<N2<N3<N4).

Securing Executables and their Functionality

In at least one embodiment, there is computer program E that performs an important functionality. In at least one embodiment, computer program is executable code that has been compiled from source code such as C or C++ or FORTRAN. In other embodiments, computer program may refer to virtual machine code. As an example, a computer program written in the source code language JAVA compiles to java virtual machine code, which is then executed on the JAVA virtual machine. It is important that the functionality of computer program E is not be disabled by malware. In embodiments that use vehicles such as autos and truck, E may unlock the brakes. In another vehicle embodiment, some computer program E may turn off an engine. In another embodiment, computer program E may start the turbines in a dam. In another embodiments, computer program E may carry out a financial transaction between two financial institutions. In another embodiment, computer program E may execute inside a router and help transmit data packets over the internet. In another embodiment, computer program E may regulate the water flow in a nuclear power plant. In another embodiment, computer program E may run the infrastructure in an oil refinery plant.

In at least one embodiment, there are methods used to prevent malware from changing or corrupting the functionality of some computer program E, which may be in the form of executable code. The methods that protect against malware may be combined in various ways in different embodiments. One method is to authenticate the computer code. This means that the method assures that the purpose or functionality of the computer code is not altered. This method is helpful in cyber security as some kinds of malware change or sabotage the purpose of the computer program. As an example, malware may lock the brakes in an automobile when the driver did not press on the brake pedal. Sometimes, the malware may reach the network of the automobile via wireless access. One method is for the authentication to occur by creating a signature S for correct computer program E and making all other programs that call or request the functionality from computer program E to communicate to computer program E that they know this signature. Consider program F which would like to call computer program E, and then it could take a private key V and sign signature S without revealing S so that malware cannot fake knowledge of the signature. In this embodiment, D(V, S) may be transmitted to computer program E along with a request to execute computer program E. Computer program E validates the signature by decrypting with public key P and then checking that S is a valid signature for computer program E. In at least one embodiment, the signature S may be created at the time of programming the chip that contains computer program E. In other embodiments, signature S may be created later after the vehicle is registered with one or more owners. This might occur after the automobile has been purchased by an owner. In an embodiment, the computer program is authenticated by using a signature associated with the computer program. In an embodiment, the computer program (which is authenticated by using a signature associated with the computer program) must receive verification that user system knows the signature in order to execute the transaction. In an embodiment, validating that the user knows the computer program signature also involves authenticating the user with a biometric. In an embodiment, the user system is executed by one or more processors in a vehicle. In an embodiment, validating that user knows the computer program also has the user validate transaction information on the display screen. In an embodiment, the service provider is executed by one or more processors in a vehicle.

In other embodiments, computer program E may have functionality that executes a financial transaction for a financial institution such as a bank or investment fund or even a government institution such as the post office, the IRS or Freddie Mac.

User Interface in the Secure Area

In at least one embodiment, the user interface may be connected to the secure area of the device may have a display screen and navigation buttons or character entry of letters, numbers or symbols using a touch sensitive screen. In at least one embodiment, the device may have a USB connection. In at least one embodiment, the device containing the secure area 102 may contain a wireless chip and a battery. In at least one embodiment, the device may be a mobile phone.

Figure 8:
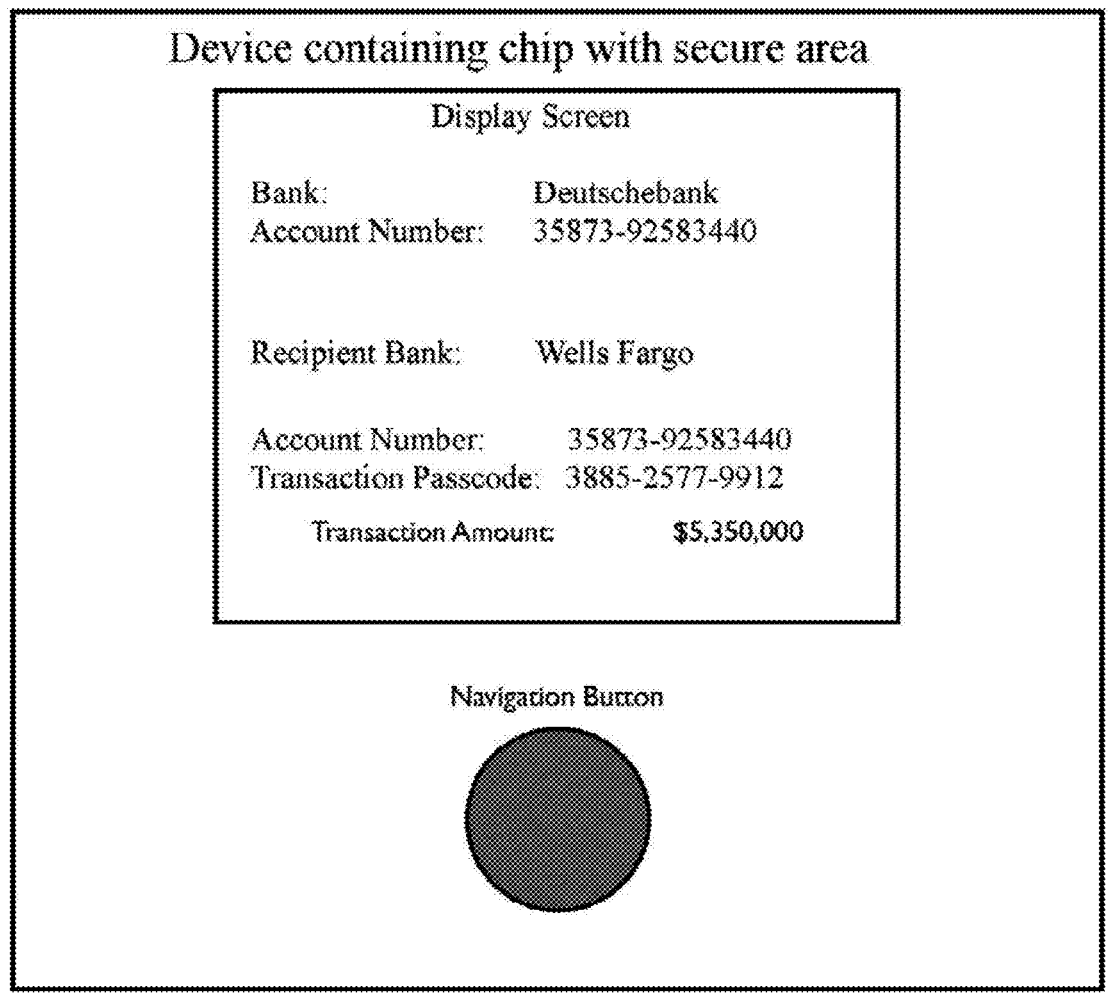
FIG. 8 shows an embodiment of a display screen that may use an LCD.

FIG. 8 shows a display screen. In at least one embodiment, the display screen may be an OLED. In other embodiments, the display screen may use an LCD. In at least one embodiment, some or all of the financial institution members of SWIFT may be stored into the secure area of the chip inside the device when the user registers with the bank or opens an account. In at least one embodiment, the user may use the navigation buttons, and/or character entry of letters, numbers or symbols using a touch sensitive screen and a display screen to scroll and select one of the banks to make a transaction with. In at least one embodiment, the user may use navigations buttons or a touch sensitive screen and display screen to scroll and select other transaction information stored in the secure area of the chip. In at least one embodiment, the user may use the navigation buttons and display screen to scroll and select letters or words that help enter transaction information.

In at least one embodiment, the user may be an employee of the bank. In at least one embodiment, the device may be used to securely execute wire transfers between two banks. In at least one embodiment, the device containing the secure area may contain a microphone. In at least one embodiment, the secure area of the chip may contain speech recognition code to receive transaction instructions or information from the user. In at least one embodiment, the device may have one or more biometric sensors. In at least one embodiment, the display screen may act as a keyboard for entering passwords and transaction information. In at least one embodiment, the display screen may enable the user to verify that the transaction information is correct or has not been tampered with by malware before executing the transaction.

In an embodiment, each passcode generator is not stored in a database but stored in a separate chip which is indexed by the user's name and/or user id. In an embodiment, the function call trx1_passcode(user_name, routing_number, trx_amount); is passed in the user's name, user_name, the user's routing number, routing_number, and the transaction amount, trx_amount, and trx1_passcode returns a transaction passcode that the bank expects to be the correct passcode.

The returned transaction passcode is compared to the transaction code received from the user's device. This embodiment protects the passcode generator, because the passcode generator never leaves the separate chip.

In an alternative embodiment, trx2_passcode(recipient_name, receipient_routing number, trx_amount); passes the user's name, user_name, the user's routing number, routing_number, and the transaction amount, trx_amount, and trx1_passcode returns a transaction passcode Q that the bank expects to be the correct transaction passcode, which is dependent on the recipient's name, the recipient's routing number and the transaction amount to be sent from the user to the recipient. The transaction passcode Q is compared to the transaction passcode received from the user's device, which may be a token, mobile phone or other device. In an embodiment, an interface retrieves a passcode generator, passcode_generator, from a database. In an embodiment, the interface is implemented with the diameter protocol <http://en.wikipedia.org/wiki/Diameter_(protocol)>. In an alternative embodiment, the interface is implemented with the RADIUS protocol <http://en.wikipedia.org/wiki/RADIUS>. In an embodiment, each passcode_generator is stored in an embedded database. In an embodiment, the passcode generator, passcode_generator, is a string of the form "23 102 215 211 55 125 14 25 36 48 152 201 106 11 77 20 21 76 53 89 29 104 114 188 209 45 135 94 15 35 47 254 219 125 35 14 19 25 27 244 236" or the string might be longer. In an embodiment, the passcode generator, passcode_generator, is a sequence of bytes of the form: "2AB02CE4E1BA93 DBC9E844E6551E3CC3FF83A7877B1A4A3205885E7 24159AB72918A FCD15FE817A87B305F43C10500CE2290C49AC032F7 B674230A84FEA2DD1E".

In an embodiment, the passcode generator, passcode_generator may be substantially longer. For example, passcode_generator may have a length of 2048 bytes or 65,536 bytes.

In the C programming language the length of the passcode generator could be declared as follows
unsigned char passcode_generator[64]; or
char passcode_generator[2048]; or unsigned char passcode_generator[65536];
An example of a user_name is Alex Barangan. In the C programming language the user name could be declared as follows. unsigned char user_name[200]={'A', 'l', 'e', 'x', ' ', 'B', 'a', 'r', 'a', 'n', 'g', 'a', 'n', '\0'};

An example of a routing_number is string "124000379". An example of trx_amount is "$5000".

Cryptor is the name of function that encrypts or decrypts transaction data. In an embodiment, the function the decrypts and encrypts transactions may execute a symmetric cryptography algorithm such as AES-256. In another embodiment, function that encrypts or decrypts transaction data, cryptor, may execute an asymmetric cryptography algorithm such as RSA or ECC (Elliptic curve cryptography).

Consider the C function call cryptor("d", ciper_text, key_bytes).
The option "d" tells the function to decrypt ciper_text. In an embodiment ciper_text is an encypted string of the form "A1092BFF . . . 55." In an alternative embodiment "127 134 147 189 209 . . . 234". This represents the text that has been encrypted. key_bytes is the variable storing the key that is used by cryptor to decrypt ciper_text. In an embodiment, key_bytes is a string of the form "7BCAF22D . . . 0E38". In an alternative embodiment, "123 202 242 45 . . . 14 156". In an embodiment, key_bytes may have length of 32 bytes. In another embodiment, key_bytes may have length of 2048 bytes. In an embodiment, the decrypted ciphertext may be returned in the string ciper_text.

Consider the C function call cryptor("e", plain_text, key_bytes); The option "e" tells the function to encrypt plain_text. In an embodiment plain_text is a string of the form "User: Alex Barangan. Account Number: 121456789-3456789956. Bank: Wells Fargo. Amount: $5000. Recipient: Michael Fiske. Account Number: 101345729-2411779888 Bank: Citibank" This represents the text that has been encrypted. key_bytes is the variable storing the key that is used by cryptor to encrypt plain_text.

In an embodiment, key_bytes is a string of the form "7BCAF22D . . . 0E38". In an alternative embodiment, key_bytes may have the string "123 202 242 45 . . . 14 156". In an embodiment, key_bytes may have length of 32 bytes. In another embodiment, key_bytes may have length of 2048 bytes. In an embodiment, the encrypted ciphertext may be returned in the string plain_text.

Transaction Demo Steps
Some of the details of these steps are for pedagogical purposes in order to teach or demonstrate to a potential licensee how the underlying security works.

Step 1. Enter transaction information into the secure area. For example the transaction information may be
Name: Alex Barangan
Routing Number: 121 456 789
Transaction Amount $: 5000

Step 2. The secure area displays in encrypted form the transaction information on the display screen (e.g., an organic light emitting diode OLED). In some production versions the encrypted transaction information is not displayed, but is wirelessly sent to the web browser or backend.

Step 3. A user with privileged access to the secure area manually enters this encrypted information read off the display along with a one-time passcode into that browser at a webpage, such as www.biogy.com/TRX. Similarly, in at least some production version the encrypted transaction information with the one-time passcode is sent automatically to the system that would from the secure area of the user system to the service provider system. For example, the format of the information may be
Passcode: trx_passcode
Name: enc_name
Routing Number: enc_routing_number
Transaction Amount: enc_trx_amount
where trx_passcode is the variable for storing the passcode, enc_name is the variable for storing the name, enc_routing_number, is the variable for storing the routing number, and enc_trx_amount is the variable for storing the transaction amount. (The above encrypted info depends on entering this information directly into the device in step 1.)

The correct passcode is dependent on the name, routing number, transaction amount and the passcode generator. A function called trx_passcode will return the correct passcode (under normal conditions, returning the passcode would be sent automatically but for purposes of better understanding this embodiment, this is important.)

Step 4. A web browser checks trx_passcode and makes the following executable calls:
cryptor d enc_name passcode_generator
and name_ints is returned
cryptor d enc_routing_number passcode_generator
and routing_number_ints is returned
cryptor d enc_trx_amount passcode_generator
and trx_amount_ints is returned
ints_to_str name_ints
name is returned
ints_to_str routing_number_ints
routing_number is returned
ints_to_str_trx_amount_ints
trx_amount is returned
authenticate_passcode name routing_number trx_amount passcode_generator trx_passcode The following algorithm may be executed.

```
If passcode is valid
{
    next_generator catches returned value of authenticate_passcode
    x . . .
    cryptor e name_ints next_generator
    returns enc2_name
    cryptor e routing_number_ints next_generator
    returns enc2_routing_number
    cryptor e trx_amount_ints next_generator
    returns enc2_trx_amount
}
else
{
    Indicate invalid one_time_passcode.
    Transaction not completed. (an option may be put here for how to handle the errror).
    Exit
}
```

-continued

If passcode is valid, browser displays new encrypted information on the web page:
Passcode: Valid Transaction Passcode
Name: enc2_name
Routing Number: enc2_routing_number
Transaction Amount: enc2_trx_amount Step 5. The encrypted fields are read by the person off the browser, entered back into the secure area. In at least some production versions the encrypted information is automatically transmitted from the service provider system back into the secure area. The personal vault or secure area checks to see that new encrypted information matches the transaction information sent in step 1. If there is a match, the match confirms that the backend actually has the correct transaction information.

Step 6. If there is a match, the vault sends a new passcode passcode_authorize and new encrypted transaction info back (resulting from a third encryption) to web browser to authorize the transaction. The information sent may include
Passcode: passcode_authorize
Name: enc3_name
Routing Number: enc3_routing_number
Transaction Amount: enc3_trx_amount Step 7. The browser indicates successful transaction with transaction confirmation number displayed. Critical transaction details are encrypted.

Figure 9:
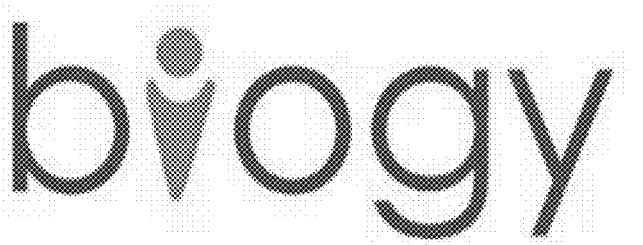
FIG. 9 shows a screenshot of an embodiment of user interface for entering the registration code of a user.

Transaction Demo Steps.
An interface retrieves the passcode generator, passcode_generator, from a database. trx_passcode(name, routing_number, trx_amount, passcode_generator), in which the transaction passcode (trx_passcode) is computed based on the name on the account (name), the routing number (routing_number), the transaction amount trx_passcode (trx_amount), and passcode generator (passcode_generator).
On the Unix Command Line:
authenticate_passcode x name routing_number trx_amount passcode_generator where:
name is plaintext string of the form "Alex".
routing_number is plaintext string of the form "124000379".
trx_amount is plaintext string of the form "123456789".
In an embodiment, passcode_generator is a string of the form
"123 202 242 209 45 135 94 15 35 47 254 219 125 35 14 19"
cryptor xd ciper_text key_bytes
In an embodiment, ciper_text is encrypted of the form "127 134 147 189 209 . . . 234" key_bytes is a string of the form "123 202 242 209 45 135 94 15 35 47 254 219 125 35 14 19". The trx_passcode function returns a decrypted string of the form "97 84 57 92 201 . . . 207"
In an embodiment, cryptor xd uses an internal static_key
cryptor xe plain_text key_bytes
plain_text is string of the form "127 134 147 189 209 . . . 234"
key_bytes is string of the form
"123 202 242 209 45 135 94 15 35 47 254 219 125 35 14 19" Returns an encrypted string of the form "97 84 57 92 201 . . . 207" In an embodiment, cryptor xe uses an internal static_key
FIG. 9 shows a screenshot of an embodiment of user interface 900, which is for entering the registration of a user. FIG. 9 has user name field 902, registration code field 904, register button 906 and authentication link 908. In other embodiments, user interface 900 may not have all of the elements listed and/or may have other elements instead of or in addition to those listed.

User name field 902 may be an input box to enter the user name as entering during the setup. Registration code field 904 may be the registration code received during setup that a user enters to perform a transaction. Selecting register button 906 enables a user to register for being able to execute transactions. Selection of authentication link 908, displays an authentication screen.

Figure 10:
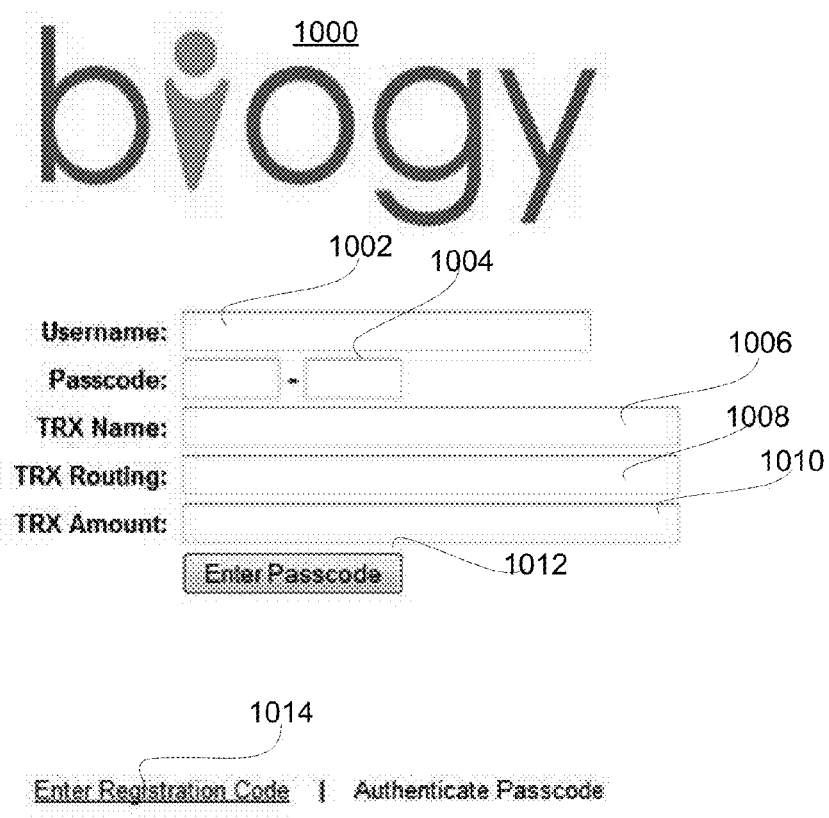
FIG. 10 shows an example of a user interface for performing a secure transaction.

FIG. 10 shows an embodiment of a screenshot of a user interface 1000, which is an embodiment of a user interface for authenticating a passcode. User interface 1000 has username field 1002, passcode field 1004, transaction name field 1006, transaction routing field 1008, transaction amount field 1010, enter button 1012 and registration code link 1014. In other embodiments, user interface 1000 may not have all of the elements listed and/or may have other elements instead of or in addition to those listed. User name field 1002 is an input box to enter the name of the user as registered during setup. Passcode field 1004 is the passcode obtained during setup, transaction name 1006. Transaction routing field 1008 maybe the routing number of the service provider. Transaction amount field 1010 is the transaction amount. Enter button 1012 when selected authenticates the passcode. Registration code link 1014 when selected displays a screenshot similar to user interface 900.

C. Database
Transaction Demo Steps
Step 1. The user enters transaction information into the secure area 102.
Name: Alex Barangan
Routing Number: 123 345 678
Transaction Amount: 1500000
Step 2. The secure area 102 displays in encrypted form the transaction information on the display (e.g., Organic Light Emitting Diode (OLED) or other display screen).
Step 3. The users with privileged access to the secure area 102 may manually enter this encrypted information to read off the display along with a one time passcode into a browser or this may be transmitted automatically. In at least some production versions, the encrypted information is transmitted automatically without being read off the display and manually entered. An example user interface 1000 is shown in FIG. 10. In the remainder of the example, the variables and functions that are used to represent the encrypted information is as follows.
Passcode: trx_passcode
Name: enc_name
Routing Number: enc_routing_number
Transaction Amount: enc_trx_amount
In the above, trx_passcode is output passcode, which results from a function that produces the passcode, using enc_name, enc_routing number, and enc_trx_amount as the inut variables, (The above encrypted information depends on entering this information directly into the device in step 1.)
The correct passcode depends on the name, routing number, transaction amount and the passcode generator. The function trx_passcode may return the correct passcode.
(Under normal conditions, the passcode trx_passcode would be sent automatically to the administrator, but for purposes of understanding the solution, an example is given in which the information is sent manually.)
Step 4. The web browser checks the passcode, trx_passcode. For example, the interface code may make the following executable calls for encrypting the transaction information. In the following, cryptor xd is an encryption function with two input variable that are encrypted together to return an encrypted output.

cryptor xd enc_name passcode_generator, which encrypts the name with the passcode generator to return the encrypted name, name_ints cryptor xd enc_routing_number passcode_generator, which encrypts the routing number with the passcode generator to return the encrypted routing number, routing_number_ints.

cryptor xd enc_trx_amount passcode_generator which encrypts the amount of the transaction with the passcode generator to return the encrypted transaction amount, trx_amount_ints.

The above encrypted information is sent to the administrator performing the transaction on behalf of the user, where the information is decrypted, as follows.

The following instruction decrypts the name ints_to_str name_ints where name is returned. The following instruction decrypts the routing number ints_to_str routing_number_ints (routing_number is returned)

The following instruction decrypts the transaction amount ints_to_str trx_amount_ints. (trx_amount is returned)
The following instruction authenticates the passcode, name, transaction amount, and routing number authenticate_passcode x name routing_number trx_amount passcode_generator trx_passcode The following routine is performed to update the passcode generator if the passcode is valid, or to abort the transaction if the passcode was not valid.

```
If passcode is valid
{
    next_generator catches returned value of authenticate_passcode
    x ...
    cryptor xe name_ints next_generator
    returns enc2_name
}
cryptor xe routing_number_ints next_generator
returns enc2_routing_number
cryptor xe trx_amount_ints next_generator
returns enc2_trx_amount
Else
{
    Indicate invalid one time passcode.
    Transaction not completed. (create an option here).
    Exit
}
```

If the passcode and other transaction information is valid, the browser displays new encrypted information on the web page:
Passcode: Valid Transaction Passcode
Name: enc2_name
Routing Number: enc2_routing number
Transaction Amount: enc2_trx_amount
Step 5. The encrypted fields are read by the person or the device from the browser, entered or transmitted back into the secure area. In an at least some production versions the encrypted information is automatically transmitted from the service provider system back into the secure area. The Personal Vault secure area checks to see that new encrypted information matches the transaction information sent in step 1.

This confirms that the backend actually has the correct transaction information.

Step 6. If the information matches, the demo device sends a new passcode passcode_authorize and new encrypted transaction information back (resulting from a third encryption) to the web browser to authorize the transaction.
Passcode: passcode_authorize
Name: enc3_name
Routing Number: enc3_routing_number
Transaction Amount: enc3_trx_amount In an embodiment, only the step 4 check is performed by the service provider if a faster transaction desired.

Extensions and Alternatives

Each embodiment disclosed herein may be used or otherwise combined with any of the other embodiments disclosed. Any element of any embodiment may be used in any embodiment. At least one embodiment of this specification includes all of the embodiments being used together except for those that are mutually exclusive.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method of securing a transaction comprising:
generating a passcode from information about the transaction, at a user system, the user system having a processor system having at least one processor, a communications interface, and a memory system, the information about the transaction being transaction information;
encrypting the transaction information, the transaction information that is encrypted includes account details;
sending, by the user system, the passcode generated and the transaction information that was encrypted, to a service provider system, for authentication in conjunction with a request to perform the transaction;
receiving; at the user system from the service provider system, a response if the passcode is valid; and
wherein the transaction information includes at least account information and information that is necessary for the transaction other than verification information and other than user identification information;
changing the passcode at each step of the transaction that involves an exchange of information related to the transaction between the user system and the service provider system; and
wherein the transaction involves at least three steps and each step involves an exchange of information related to the transaction between the user system and the service provider system.

2. The method of claim 1 further comprising,
at each step of the transaction, updating a value that is a passcode generator, and
the changing of the passcode at each step including at least, at each step generating the passcode from the passcode generator and the transaction information.

3. The method of claim 1, further comprising sending a registration code and a cryptographic key to the service provider prior to sending the passcode, the registration code originates from the user and is derived from information known only to the user.

4. The method of claim 1 further comprising sending a digital signature with the passcode and the transaction information.

5. A method of securing a transaction comprising:
sending a registration code and a cryptographic key, from a user system to a service provider prior to sending a passcode, the user system having a processor system having at least one processor, a communications interface, and a memory system;

generating the passcode from information about the transaction, at the user system;

sending, by the user system, the passcode generated to the service provider, for authentication in conjunction with a request to perform the transaction;

receiving at the user system from the service provider system, a response if the passcode is valid;

receiving, at the user system from the service provider, encrypted transaction information;

updating the passcode generator;

decrypting the encrypted transaction information with the cryptographic key;

computing a new transaction passcode with the passcode generator that was updated and the transaction information;

comparing a one-time transaction passcode received and the new transaction passcode generated;

comparing the transaction information received with stored transaction information; and if the one-time transaction passcode received and the new transaction passcode generated match and if the transaction information received matches stored transaction information, continuing the transaction.

6. The method of claim 5 further comprising:
storing a Personal Identification Number (PIN) in a secure area of the user system; and
sending a registration code, that is different from the PIN, to the service provider prior to sending the passcode.

7. The method of claim 6, further comprising:
applying a one-way function on the registration code to generate an initial passcode generator or using the registration code as the initial passcode generator, the generating of the passcode from the information about the transaction, including at least generating the passcode from the information about the transaction and from the passcode generator.

8. The method of claim 7 wherein the one-way function is a hash function.

9. The method of claim 5, wherein the user system includes a secure area and a remaining portion that includes all of the user system but the secure area, the remaining portion of the user system not having access to the secure area;
the method further comprising:
storing a transaction passcode generator in a secure area in the user system, the transaction passcode generator being a value, the transaction passcode being generated from at least a combination of the transaction passcode generator and the transaction information.

10. The method of claim 5, wherein the information includes biometric data of the user associated with the transaction.

11. The method of claim 5 wherein said passcode is not created until after a valid user authentication.

12. The method of claim 11 wherein said authentication is a biometric authentication.

13. The method of claim 11 wherein said authentication uses at least a PIN or a password.

14. The method of claim 11 wherein said authentication has user select at least one visual image.

15. The method of claim 5 where said passcode is also dependent on a seed and the current time.

16. A method comprising:
receiving, at a user system, user information from the user to authenticate the user;
sending, from a user system, a request to initiate a secure transaction with service provider system;
receiving at the user system transaction information from the user;
encrypting the transaction information with a first encryption key;
storing in a secure memory of the user system the encrypted transaction information; the transaction information including a name of a sender, which is a person or entity sending the money, a name of a person or entity receiving the money, a date associated with the transaction, an account number of the sender, an account number of a receiver, the sender's routing number, the receiver's routing number, an identifier of a product traded, the number of units exchanged, a unit price, a name of a broker, and/or an amount of money associated with the transaction;
applying, by a secure processor a hash function to a combination of a first passcode generator and the transaction information, therein generating a first one-time transaction-passcode that is based on both the transaction information and the first passcode generator;
applying a function, at the user system, to the first passcode generator to a generate a second passcode generator, for use for creating a second one time transaction passcode;
applying a function, at the user system, to the first encryption key to generate a second encryption key;
transmitting the first one-time transaction passcode and encrypted transaction information from the sender to the receiver;
receiving, at the user system from the receiver, the second one time transaction passcode and the transaction information encrypted with a second encryption key that was generated by the receiver;
decrypting, at the user system, the message that was received from the receiver, with the second encryption key that was generated at the user system;
applying, at the user system, the hash function to a combination of the transaction information and the second passcode generator to generate the second passcode;
determining, at the user system, whether the second passcode received and the second passcode generated match; if the second passcode received and the second passcode generated do not match terminating the method;
determining, at the user system, whether the transaction information sent and the transaction information received match; if the transaction information received and the transaction information sent do not match terminating the method;
applying, at the user system a function to a combination of the second passcode generator and the transaction information to generate a third transaction passcode;
applying, at the user system a function to the second encryption key to generate a third encryption key;
encrypting, at the user system, the transaction information with the third encryption key;
transmitting from the user system to the receiver the transaction information encrypted with the third encryption key and the third transaction passcode;

the secure memory and the secure processor being located in a secure area of the user system; the user system processor system and memory system that is not in the secure area, which have not access to the secure area.

17. A method comprising:
at a service provider system, receiving a request to perform a secure transaction including at least a first one-time transaction passcode and encrypted transaction information that was encrypted with a first encryption key;
decrypting, at the service provider, the transaction information;
applying a hash function to a combination of the transaction information and a first passcode generator to generate the first one-time passcode;
Comparing, by the service provider system, the first one-time passcode received to the first one-time passcode generated;
if the first one-time passcode received and the first one-time passcode generated do not match, the service provider system terminating the method;
if the first one-time passcode received and first one-time passcode generated match, then applying, by the service provider system, a hash function to the first passcode generator to generate a second passcode generator;
applying, by the service provider system, a hash function to a combination of the second passcode generator and the transaction information received to produce a second one-time transaction-passcode;
applying a function, by the service provider system, to the first encryption key to generate a second encryption key;
encrypting, by the service provider system, the transaction information with the second encryption key;
transmitting from the service provider system to the user, the second onetime transaction passcode and the encrypted transaction information that was encrypted with the second encryption key;
receiving, at the service provider, a third one time transaction passcode and the encrypted information encrypted with a third encryption key;
applying, by the service provider system, a function to the second encryption key to generate the third encryption key;
decrypting the encrypted transaction information that was encrypted with the third encryption key;
applying, by the service provider system, a function to the second passcode generator to generate the third passcode generator;
applying, by the service provider system, a function to a combination of the third passcode generator and the transaction information to generate the third one-time passcode;
comparing, by the service provider system, the third one-time transaction passcode received to the third one-time passcode generated and the transaction information encrypted with the third encryption key that was received to the transaction information;
if the third one-time transaction passcode received does not match the third one-time passcode generated terminating the method;
if the transaction information encrypted with the third encryption key that was received does not match the transaction information stored, terminating the method;
if the third one-time transaction passcode received matches the third one-time passcode generated and if the transaction information encrypted with the third encryption key that was received matches the transaction information stored, completing the transaction.

18. A method of securing a transaction comprising:
generating a first passcode from information about the transaction, at a user device, the user device having a processor system having at least one processor, a communications interface, and a memory system;
sending, by the user device, the first passcode generated to a service provider system, for authentication in conjunction with a request to perform the transaction, the request including a first encryption of transaction information from which the first passcode was generated; and
receiving at the user device from the service provider system, a second passcode generated from the transaction information with a second encryption of transaction information from which the second passcode was generated, if the first passcode is valid; and
sending, by the user device to the service provider system, a third passcode generated, by the user device, from the transaction information if the second passcode is valid, the third passcode being sent with a third encryption of transaction information from which the third passcode was generated.

19. The method of claim 18, wherein said service provider system is a bank or financial exchange.

20. The method of claim 19, wherein said financial exchange is a stock exchange.

21. The method of claim 18, wherein the first passcode generated and the second passcode generated having at least two symbols.

22. The method of claim 18, wherein the transaction information includes a number of units associated with the transaction.

23. The method of claim 18, wherein the transaction information includes a routing number associated with a financial institution.

24. The method of claim 18, wherein the transaction information includes at least an identifier of a product traded.

25. The method of claim 18, wherein the transaction information includes at least an identifier of the number of units exchanged.

26. The method of claim 18, wherein the transaction information includes at least a unit price.

27. The method of claim 18, wherein the transaction information includes at least a name of a broker.

28. A method of securing a transaction comprising:
generating a passcode from information about the transaction with a passcode generator, at a user system, the user system having a processor system having at least one processor, a communications interface, and a memory system;
sending, by the user system, the passcode generated to a service provider system, for authentication in conjunction with a request to perform the transaction;
receiving, at the user system from the service provider system, a response if the passcode is valid;
wherein the transaction information includes at least information that is necessary for the transaction other than verification information and other than user identification information;
sending a registration code and a cryptographic key to the service provider system prior to sending the passcode;
receiving, at the user system from the service provider system, encrypted transaction information;

updating the passcode generator;
decrypting the encrypted transaction information with the cryptographic key;
computing a new transaction passcode with the updated passcode generator and the decrypted transaction information;
comparing a one-time transaction passcode received and the new transaction passcode generated;
comparing the transaction information received with stored transaction information; and
if the one-time transaction passcode received and the new transaction passcode generated match and if the transaction information received matches stored transaction information, continuing the transaction.

* * * * *